US008357034B2

(12) United States Patent
Smith et al.

(10) Patent No.: US 8,357,034 B2
(45) Date of Patent: Jan. 22, 2013

(54) GAMING SYSTEM AND METHOD PROVIDING THIRD PARTY PROMOTIONS

(75) Inventors: Vincent P. Smith, Las Vegas, NV (US); Anthony J. Baerlocher, Reno, NV (US); Daniel J. DeWaal, Las Vegas, NV (US)

(73) Assignee: IGT, Reno, NV (US)

( * ) Notice: Subject to any disclaimer, the term of this patent is extended or adjusted under 35 U.S.C. 154(b) by 1266 days.

(21) Appl. No.: 11/937,382

(22) Filed: Nov. 8, 2007

(65) Prior Publication Data

US 2009/0124384 A1 May 14, 2009

(51) Int. Cl.
*A63F 13/00* (2006.01)

(52) U.S. Cl. .......... 463/25

(58) Field of Classification Search .......... 463/25, 463/40–42; 705/14.1, 14.12, 14.3, 14.4
See application file for complete search history.

(56) References Cited

U.S. PATENT DOCUMENTS

| | | | |
|---|---|---|---|
| 3,852,576 | A | 12/1974 | Rudd |
| 4,301,505 | A | 11/1981 | Catiller et al. |
| 4,607,155 | A | 8/1986 | Nao et al. |
| 4,652,998 | A | 3/1987 | Koza et al. |
| 4,667,336 | A | 5/1987 | Best |
| 4,745,468 | A | 5/1988 | Von Kohorn |
| 4,876,592 | A | 10/1989 | Von Kohorn |
| 5,022,172 | A | 6/1991 | Kawahara et al. |
| 5,025,372 | A | 6/1991 | Burton et al. |
| 5,083,271 | A | 1/1992 | Thacher et al. |
| 5,129,652 | A | 7/1992 | Wilkinson |
| 5,229,764 | A | 7/1993 | Matchett et al. |
| 5,259,613 | A | 11/1993 | Marnell, II |
| 5,269,522 | A | 12/1993 | Chagoll et al. |
| 5,283,734 | A | 2/1994 | Von Kohorn |
| 5,290,033 | A | 3/1994 | Bittner et al. |
| 5,361,871 | A | 11/1994 | Gupta et al. |
| 5,362,051 | A | 11/1994 | Swafford, Jr. et al. |
| 5,367,644 | A | 11/1994 | Yokoyama et al. |
| 5,368,129 | A | 11/1994 | Von Kohorn |
| 5,373,440 | A | 12/1994 | Cohen et al. |
| 5,379,382 | A | 1/1995 | Work et al. |

(Continued)

FOREIGN PATENT DOCUMENTS

EP 1 746 550 1/2007

(Continued)

OTHER PUBLICATIONS

Atronic Systems Progressive Products at G2E, published by Atronic in 2004, printed from ForRelease.com.

(Continued)

*Primary Examiner* — David L Lewis
*Assistant Examiner* — Matthew D. Hoel
(74) *Attorney, Agent, or Firm* — Neal, Gerber & Eisenberg LLP

(57) ABSTRACT

A gaming system and method disclosed herein enable players to earn promotional awards at gaming machines without sacrificing or surrendering player tracking points. The gaming system and method also provide value to players without the casino absorbing the cost of such value. The gaming system and method disclosed herein creates a new type of currency redeemable for a good or service (or a discount on a good or service) associated with a point-of-sale independent of the casino. In one form, the player tracking currency does not cost the casino or the player anything.

26 Claims, 9 Drawing Sheets

U.S. PATENT DOCUMENTS 5,392,066 A 2/1995 Fisher et al.
5,397,125 A 3/1995 Adams
5,429,361 A 7/1995 Raven et al.
5,470,079 A 11/1995 LeStrange et al.
5,488,411 A 1/1996 Lewis
5,551,692 A 9/1996 Pettit et al.
5,555,497 A 9/1996 Helbling
5,559,794 A 9/1996 Willis et al.
5,564,546 A 10/1996 Molbak et al.
5,586,936 A 12/1996 Bennett et al.
5,609,337 A 3/1997 Clapper, Jr.
5,615,109 A 3/1997 Eder
5,620,182 A 4/1997 Rossides
5,635,696 A 6/1997 Dabrowski et al.
5,636,346 A 6/1997 Saxe
5,643,086 A 7/1997 Alcorn et al.
5,668,591 A 9/1997 Shintani
5,674,128 A 10/1997 Holch et al.
5,697,844 A 12/1997 Von Kohorn
5,708,838 A 1/1998 Robinson
5,721,827 A 2/1998 Logan et al.
5,721,958 A 2/1998 Kikinis
5,722,890 A 3/1998 Libby et al.
5,729,697 A 3/1998 Schkolnick et al.
5,741,183 A 4/1998 Acres et al.
5,759,101 A 6/1998 Von Kohorn
5,759,102 A 6/1998 Pease et al.
5,761,647 A 6/1998 Boushy
5,779,549 A 7/1998 Walker et al.
5,791,991 A 8/1998 Small
5,806,852 A 9/1998 Howes
5,813,913 A 9/1998 Berner et al.
5,816,918 A * 10/1998 Kelly et al. .................... 463/16
5,820,459 A 10/1998 Acres et al.
5,823,874 A 10/1998 Adams
5,833,540 A 11/1998 Miodunski et al.
5,848,399 A 12/1998 Burke
5,848,935 A 12/1998 Noell et al.
5,851,149 A 12/1998 Xidos et al.
5,855,514 A 1/1999 Kamille
5,857,175 A 1/1999 Day et al.
5,859,414 A 1/1999 Grimes et al.
5,882,258 A 3/1999 Kelly et al.
5,883,620 A 3/1999 Hobbs et al.
5,912,743 A 6/1999 Kinebuchi et al.
5,918,211 A 6/1999 Sloane
5,919,091 A 7/1999 Bell et al.
5,928,082 A 7/1999 Clapper, Jr.
5,933,811 A 8/1999 Angles et al.
5,935,000 A 8/1999 Sanchez, III et al.
5,939,695 A 8/1999 Nelson
5,941,771 A 8/1999 Haste, III
5,941,772 A 8/1999 Paige
5,943,241 A 8/1999 Nichols et al.
5,949,042 A 9/1999 Dietz, II et al.
5,951,397 A 9/1999 Dickinson
5,958,020 A 9/1999 Evoy et al.
5,978,920 A 11/1999 Lee
5,979,757 A 11/1999 Tracy et al.
5,980,385 A 11/1999 Clapper, Jr.
5,993,316 A 11/1999 Coyle et al.
6,003,013 A 12/1999 Boushy et al.
6,009,412 A 12/1999 Storey
6,012,984 A 1/2000 Roseman
6,015,344 A 1/2000 Kelly et al.
6,017,032 A 1/2000 Grippo et al.
6,021,362 A 2/2000 Maggard et al.
6,026,370 A 2/2000 Jermyn
6,035,279 A 3/2000 Montangero et al.
6,036,601 A 3/2000 Heckel
6,041,308 A 3/2000 Walker et al.
6,048,268 A 4/2000 Humble
6,048,269 A 4/2000 Burns et al.
6,071,190 A 6/2000 Weiss et al.
6,088,802 A 7/2000 Bialick et al.
6,089,975 A 7/2000 Dunn
6,089,981 A 7/2000 Brenner et al.
6,098,837 A 8/2000 Izawa et al.
6,104,815 A 8/2000 Alcorn et al.
6,106,396 A 8/2000 Alcorn et al.
6,110,042 A 8/2000 Walker et al.
6,113,495 A 9/2000 Walker et al.
6,117,010 A 9/2000 Canterbury et al.
6,119,101 A 9/2000 Peckover
6,135,887 A 10/2000 Pease et al.
6,138,911 A 10/2000 Fredregill et al.
6,141,006 A 10/2000 Knowlton et al.
6,142,876 A 11/2000 Cumbers
6,149,522 A 11/2000 Alcorn et al.
6,162,122 A 12/2000 Acres et al.
6,165,070 A 12/2000 Nolte et al.
6,168,522 B1 1/2001 Walker et al.
6,173,267 B1 1/2001 Cairns
6,183,362 B1 2/2001 Boushy
6,186,893 B1 2/2001 Walker et al.
6,193,608 B1 2/2001 Walker et al.
6,210,279 B1 4/2001 Dickinson
6,244,958 B1 6/2001 Acres
6,251,017 B1 6/2001 Leason et al.
6,264,556 B1 7/2001 Izawa et al.
6,280,326 B1 8/2001 Saunders
6,280,328 B1 8/2001 Holch et al.
6,289,261 B1 9/2001 Heidel et al.
6,293,865 B1 * 9/2001 Kelly et al. .................... 463/16
6,293,867 B1 9/2001 Heidel et al.
6,302,793 B1 10/2001 Fertitta, III et al.
6,315,665 B1 11/2001 Faith
6,332,099 B1 12/2001 Heidel et al.
6,352,175 B2 3/2002 Izawa et al.
6,368,216 B1 4/2002 Hedrick et al.
6,390,917 B1 5/2002 Walker et al.
6,401,074 B1 6/2002 Sleeper
6,439,997 B1 8/2002 Brasseur et al.
6,443,843 B1 9/2002 Walker et al.
6,447,395 B1 9/2002 Stevens
6,484,146 B2 11/2002 Day et al.
6,565,434 B1 5/2003 Acres
6,571,216 B1 5/2003 Garg et al.
6,578,012 B1 6/2003 Storey
6,609,978 B1 8/2003 Paulsen
6,623,357 B2 9/2003 Chowdhury
6,645,068 B1 * 11/2003 Kelly et al. ...................... 463/9
6,663,105 B1 12/2003 Sullivan et al.
6,857,959 B1 2/2005 Nguyen
6,890,256 B2 5/2005 Walker et al.
6,892,056 B1 5/2005 Garmonov et al.
6,937,995 B1 8/2005 Kepecs
7,024,374 B1 4/2006 Day et al.
7,025,674 B2 4/2006 Adams et al.
7,054,830 B1 5/2006 Eggleston et al.
7,063,617 B2 6/2006 Brosnan et al.
7,094,149 B2 8/2006 Walker et al.
7,096,190 B2 8/2006 Postrel
7,127,069 B2 10/2006 Nguyen
7,140,964 B2 11/2006 Walker et al.
7,192,350 B2 3/2007 Nguyen
7,216,754 B2 5/2007 Tedesco et al.
7,341,517 B2 3/2008 Asher et al.
7,347,775 B2 3/2008 Roemer
7,387,571 B2 6/2008 Walker et al.
7,390,264 B2 6/2008 Walker et al.
7,392,470 B2 6/2008 Kammler
7,401,032 B1 7/2008 Golden et al.
7,455,586 B2 11/2008 Nguyen et al.
7,485,040 B2 2/2009 Walker et al.
7,658,674 B2 2/2010 Walker et al.
7,717,788 B2 * 5/2010 Rowe ............................ 463/25
7,762,885 B2 * 7/2010 Kelly et al. .................... 463/25
7,997,972 B2 8/2011 Nguyen et al.
2002/0002075 A1 1/2002 Rowe
2002/0013744 A1 1/2002 Tsunenari et al.
2002/0029339 A1 * 3/2002 Rowe .......................... 713/182
2002/0039921 A1 4/2002 Rowe et al.
2002/0094871 A1 7/2002 Luciano et al.
2002/0107610 A1 8/2002 Kaehler et al.
2002/0111210 A1 8/2002 Luciano et al.
2002/0128057 A1 9/2002 Walker et al.

| | | | |
|---|---|---|---|
| 2002/0138342 | A1 | 9/2002 | Clark et al. |
| 2002/0143619 | A1 | 10/2002 | Laurie |
| 2003/0003983 | A1 | 1/2003 | Walker et al. |
| 2003/0004871 | A1 | 1/2003 | Rowe |
| 2003/0013513 | A1 * | 1/2003 | Rowe .............................. 463/20 |
| 2003/0013527 | A1 | 1/2003 | Rowe et al. |
| 2003/0013532 | A1 | 1/2003 | Rowe et al. |
| 2003/0036425 | A1 | 2/2003 | Kaminkow et al. |
| 2003/0054868 | A1 | 3/2003 | Paulsen et al. |
| 2003/0054878 | A1 | 3/2003 | Benoy et al. |
| 2003/0064807 | A1 | 4/2003 | Walker et al. |
| 2003/0066883 | A1 | 4/2003 | Yu |
| 2003/0069071 | A1 | 4/2003 | Britt et al. |
| 2003/0089343 | A1 * | 5/2003 | Yamaguchi et al. .......... 123/495 |
| 2003/0109306 | A1 | 6/2003 | Karmarkar |
| 2003/0148807 | A1 | 8/2003 | Acres |
| 2003/0157979 | A1 | 8/2003 | Cannon et al. |
| 2003/0176211 | A1 | 9/2003 | Sommerville |
| 2003/0199320 | A1 | 10/2003 | Nguyen et al. |
| 2003/0216185 | A1 * | 11/2003 | Varley ............................. 463/42 |
| 2003/0224852 | A1 | 12/2003 | Walker et al. |
| 2004/0039695 | A1 | 2/2004 | Rowe |
| 2004/0106449 | A1 | 6/2004 | Walker et al. |
| 2004/0110557 | A1 | 6/2004 | Rowe |
| 2004/0166931 | A1 | 8/2004 | Criss-Puszkiewicz et al. |
| 2005/0027381 | A1 | 2/2005 | George et al. |
| 2005/0037842 | A1 | 2/2005 | Kastner |
| 2005/0043082 | A1 | 2/2005 | Peterson et al. |
| 2005/0060050 | A1 | 3/2005 | Baerlocher |
| 2005/0096123 | A1 | 5/2005 | Cregan et al. |
| 2005/0096124 | A1 | 5/2005 | Stronach |
| 2005/0096126 | A1 | 5/2005 | Prasad |
| 2005/0124411 | A1 | 6/2005 | Schneider |
| 2005/0143169 | A1 | 6/2005 | Nguyen et al. |
| 2005/0164779 | A1 | 7/2005 | Okuniewicz |
| 2005/0181864 | A1 | 8/2005 | Britt et al. |
| 2005/0215316 | A1 | 9/2005 | Rowe et al. |
| 2005/0239530 | A1 | 10/2005 | Walker et al. |
| 2005/0250567 | A1 | 11/2005 | Kane et al. |
| 2005/0251440 | A1 | 11/2005 | Bednarek |
| 2005/0255911 | A1 | 11/2005 | Nguyen et al. |
| 2005/0255922 | A1 | 11/2005 | Nguyen et al. |
| 2005/0261059 | A1 | 11/2005 | Nguyen et al. |
| 2005/0261060 | A1 | 11/2005 | Nguyen et al. |
| 2005/0261061 | A1 | 11/2005 | Nguyen et al. |
| 2005/0261913 | A1 | 11/2005 | Lapointe |
| 2005/0266919 | A1 | 12/2005 | Rowe et al. |
| 2006/0019734 | A1 | 1/2006 | Roemer |
| 2006/0019743 | A1 | 1/2006 | Roemer |
| 2006/0019744 | A1 | 1/2006 | Roemer |
| 2006/0025212 | A1 | 2/2006 | Griswold |
| 2006/0035707 | A1 | 2/2006 | Nguyen et al. |
| 2006/0046817 | A1 | 3/2006 | Paulsen et al. |
| 2006/0046842 | A1 | 3/2006 | Mattice et al. |
| 2006/0052150 | A1 | 3/2006 | Hedrick et al. |
| 2006/0052169 | A1 | 3/2006 | Britt et al. |
| 2006/0063580 | A1 | 3/2006 | Nguyen et al. |
| 2006/0073888 | A1 | 4/2006 | Nguyen et al. |
| 2006/0111172 | A1 | 5/2006 | Walker et al. |
| 2006/0128460 | A1 | 6/2006 | Muir et al. |
| 2006/0142078 | A1 | 6/2006 | Walker et al. |
| 2006/0154719 | A1 | 7/2006 | Okuniewicz |
| 2006/0154720 | A1 | 7/2006 | Okuniewicz |
| 2006/0154723 | A1 | 7/2006 | Saffari et al. |
| 2006/0154724 | A1 | 7/2006 | Okuniewicz |
| 2006/0154727 | A1 | 7/2006 | Okuniewicz |
| 2006/0154730 | A1 | 7/2006 | Okuniewicz |
| 2006/0189367 | A1 | 8/2006 | Nguyen et al. |
| 2006/0201775 | A1 | 9/2006 | Tedesco et al. |
| 2006/0205485 | A1 | 9/2006 | Walker et al. |
| 2006/0211475 | A1 | 9/2006 | Walker et al. |
| 2006/0211476 | A1 | 9/2006 | Walker et al. |
| 2006/0211477 | A1 | 9/2006 | Walker et al. |
| 2006/0211479 | A1 | 9/2006 | Walker et al. |
| 2006/0211480 | A1 | 9/2006 | Walker et al. |
| 2006/0211493 | A1 | 9/2006 | Walker et al. |
| 2006/0217175 | A1 | 9/2006 | Walker et al. |
| 2006/0217176 | A1 | 9/2006 | Walker et al. |
| 2006/0217190 | A1 | 9/2006 | Walker et al. |

| | | | |
|---|---|---|---|
| 2006/0223606 | A1 | 10/2006 | Walker et al. |
| 2006/0223607 | A1 | 10/2006 | Walker et al. |
| 2006/0223608 | A1 | 10/2006 | Walker et al. |
| 2006/0223629 | A1 | 10/2006 | Walker et al. |
| 2006/0227635 | A1 | 10/2006 | Walker et al. |
| 2006/0227636 | A1 | 10/2006 | Walker et al. |
| 2006/0229125 | A1 | 10/2006 | Walker et al. |
| 2006/0232004 | A1 | 10/2006 | Walker et al. |
| 2006/0240887 | A1 | 10/2006 | Walker et al. |
| 2006/0240889 | A1 | 10/2006 | Walker et al. |
| 2006/0240890 | A1 | 10/2006 | Walker et al. |
| 2006/0246984 | A1 | 11/2006 | Walker et al. |
| 2006/0246985 | A1 | 11/2006 | Walker et al. |
| 2006/0247012 | A1 | 11/2006 | Walker et al. |
| 2006/0247016 | A1 | 11/2006 | Walker et al. |
| 2006/0247026 | A1 | 11/2006 | Walker et al. |
| 2006/0247030 | A1 | 11/2006 | Walker et al. |
| 2006/0247035 | A1 | 11/2006 | Rowe et al. |
| 2006/0252522 | A1 | 11/2006 | Walker et al. |
| 2006/0252524 | A1 | 11/2006 | Friesen et al. |
| 2006/0252528 | A1 | 11/2006 | Walker et al. |
| 2006/0252534 | A1 | 11/2006 | Walker et al. |
| 2006/0258422 | A1 | 11/2006 | Walker et al. |
| 2006/0258442 | A1 | 11/2006 | Ryan |
| 2006/0259318 | A1 | 11/2006 | Walker et al. |
| 2006/0281537 | A1 | 12/2006 | Abbott et al. |
| 2006/0281541 | A1 | 12/2006 | Nguyen et al. |
| 2006/0287040 | A1 | 12/2006 | Walker et al. |
| 2006/0287054 | A1 | 12/2006 | Walker et al. |
| 2006/0287071 | A1 | 12/2006 | Walker et al. |
| 2006/0287072 | A1 | 12/2006 | Walker et al. |
| 2007/0001397 | A1 | 1/2007 | Walker et al. |
| 2007/0001398 | A1 | 1/2007 | Walker et al. |
| 2007/0004502 | A1 | 1/2007 | Walker et al. |
| 2007/0004511 | A1 | 1/2007 | Walker et al. |
| 2007/0004518 | A1 | 1/2007 | Friesen et al. |
| 2007/0012542 | A1 | 1/2007 | Tedesco et al. |
| 2007/0016535 | A1 | 1/2007 | Tedesco et al. |
| 2007/0021164 | A1 | 1/2007 | Lind et al. |
| 2007/0050256 | A1 | 3/2007 | Walker et al. |
| 2007/0060365 | A1 | 3/2007 | Tien et al. |
| 2007/0077978 | A1 | 4/2007 | Walker et al. |
| 2007/0077981 | A1 | 4/2007 | Hungate et al. |
| 2007/0087756 | A1 | 4/2007 | Hoffberg |
| 2007/0087831 | A1 | 4/2007 | Van Luchene et al. |
| 2007/0087834 | A1 | 4/2007 | Moser et al. |
| 2007/0105613 | A1 | 5/2007 | Adams et al. |
| 2007/0105617 | A1 | 5/2007 | Walker et al. |
| 2007/0105630 | A1 | 5/2007 | Van Luchene |
| 2007/0111787 | A1 | 5/2007 | Adams et al. |
| 2007/0117612 | A1 | 5/2007 | Walker et al. |
| 2007/0129136 | A1 | 6/2007 | Walker et al. |
| 2007/0129137 | A1 | 6/2007 | Walker et al. |
| 2007/0129141 | A1 | 6/2007 | Walker et al. |
| 2007/0129149 | A1 | 6/2007 | Walker et al. |
| 2007/0149278 | A1 | 6/2007 | Walker et al. |
| 2007/0155465 | A1 | 7/2007 | Walker et al. |
| 2007/0155490 | A1 | 7/2007 | Phillips et al. |
| 2007/0167209 | A1 | 7/2007 | Jaffe et al. |
| 2007/0167210 | A1 | 7/2007 | Kelly et al. |
| 2007/0167212 | A1 | 7/2007 | Nguyen |
| 2007/0167216 | A1 | 7/2007 | Walker et al. |
| 2007/0167226 | A1 | 7/2007 | Kelly et al. |
| 2007/0168251 | A1 | 7/2007 | Hilbert et al. |
| 2007/0180371 | A1 | 8/2007 | Kammler |
| 2007/0197294 | A1 | 8/2007 | Gong |
| 2007/0198432 | A1 | 8/2007 | Pitroda et al. |
| 2007/0202941 | A1 | 8/2007 | Miltenberger et al. |
| 2007/0213124 | A1 | 9/2007 | Walker et al. |
| 2007/0233615 | A1 | 10/2007 | Tumminaro |
| 2007/0243925 | A1 | 10/2007 | Lemay et al. |
| 2007/0243928 | A1 * | 10/2007 | Iddings ........................... 463/26 |
| 2007/0243934 | A1 | 10/2007 | Little et al. |
| 2007/0244811 | A1 | 10/2007 | Tumminaro |
| 2007/0254736 | A1 | 11/2007 | Hardy et al. |
| 2007/0255620 | A1 | 11/2007 | Tumminaro et al. |
| 2007/0255652 | A1 | 11/2007 | Tumminaro et al. |
| 2007/0255653 | A1 | 11/2007 | Tumminaro et al. |
| 2007/0255662 | A1 | 11/2007 | Tumminaro |

| | | | | |
|---|---|---|---|---|
| 2007/0259709 | A1* | 11/2007 | Kelly et al. | 463/20 |
| 2007/0270213 | A1 | 11/2007 | Nguyen et al. | |
| 2007/0271194 | A1 | 11/2007 | Walker et al. | |
| 2008/0009344 | A1 | 1/2008 | Graham et al. | |
| 2008/0020848 | A1 | 1/2008 | Muir et al. | |
| 2008/0026816 | A1 | 1/2008 | Sammon et al. | |
| 2008/0026823 | A1 | 1/2008 | Wolf et al. | |
| 2008/0039189 | A1 | 2/2008 | Walker et al. | |
| 2008/0039190 | A1 | 2/2008 | Walker et al. | |
| 2008/0039192 | A1 | 2/2008 | Laut | |
| 2008/0051193 | A1 | 2/2008 | Kaminkow et al. | |
| 2008/0058086 | A1 | 3/2008 | Saffari et al. | |
| 2008/0076505 | A1 | 3/2008 | Nguyen et al. | |
| 2008/0076529 | A1 | 3/2008 | Richards et al. | |
| 2008/0096645 | A1 | 4/2008 | Frerking et al. | |
| 2008/0096650 | A1 | 4/2008 | Baerlocher | |
| 2008/0102935 | A1 | 5/2008 | Finnimore | |
| 2008/0108419 | A1 | 5/2008 | Dimichele et al. | |
| 2008/0108429 | A1 | 5/2008 | Davis et al. | |
| 2008/0108433 | A1 | 5/2008 | Dimichele et al. | |
| 2008/0113701 | A1 | 5/2008 | Schultz et al. | |
| 2008/0113702 | A1 | 5/2008 | Schultz et al. | |
| 2008/0113738 | A1 | 5/2008 | Vallejo et al. | |
| 2008/0113776 | A1 | 5/2008 | Sommer | |
| 2008/0113777 | A1 | 5/2008 | Anderson | |
| 2008/0113784 | A1 | 5/2008 | Vallejo et al. | |
| 2008/0120221 | A1 | 5/2008 | Toneguzzo | |
| 2008/0132311 | A1 | 6/2008 | Walker | |
| 2008/0146322 | A1 | 6/2008 | Hardy et al. | |
| 2008/0146323 | A1 | 6/2008 | Hardy et al. | |
| 2008/0146344 | A1 | 6/2008 | Rowe et al. | |
| 2008/0146345 | A1 | 6/2008 | Hardy et al. | |
| 2008/0146346 | A1 | 6/2008 | Hardy et al. | |
| 2008/0153583 | A1 | 6/2008 | Huntley et al. | |
| 2008/0167118 | A1 | 7/2008 | Kroeckel et al. | |
| 2008/0167123 | A1 | 7/2008 | Luciano et al. | |
| 2008/0167130 | A1 | 7/2008 | Kroeckel et al. | |
| 2008/0171586 | A1 | 7/2008 | Roemer | |
| 2008/0171602 | A1 | 7/2008 | Patel et al. | |
| 2009/0036202 | A1 | 2/2009 | Baerlocher et al. | |
| 2009/0054148 | A1 | 2/2009 | Hardy et al. | |
| 2009/0191962 | A1 | 7/2009 | Hardy et al. | |
| 2010/0029376 | A1 | 2/2010 | Hardy et al. | |

FOREIGN PATENT DOCUMENTS

| | | |
|---|---|---|
| EP | 1 814 091 | 8/2007 |
| GB | 2 144 567 | 3/1985 |
| GB | 2 251 112 | 6/1992 |
| WO | WO 99/06969 | 2/1999 |
| WO | WO 2006/002462 | 1/2006 |
| WO | WO 2006/009716 | 1/2006 |
| WO | WO 2007/087391 | 8/2007 |
| WO | WO 2007/087459 | 8/2007 |
| WO | WO 2007/130464 | 11/2007 |
| WO | WO 2008/039402 | 4/2008 |
| WO | WO 2008/060978 | 5/2008 |

OTHER PUBLICATIONS

Fast Buck Systems Manual, written by International Game Technology, available to Mirage shift supervisors at least as early as May 30, 1990.

HBP-5 Note Hopper Advertisement, printed from website on Sep. 20, 2001 (available at http://www.jcm-american.com/sub_note-hoppers.html).

HBP-10 Bill Dispenser Advertisement, printed from website on Sep. 20, 2001 (available at http://www.jcm-american.com/bill_dispenser.html).

PEM—Precision Electronic Meter, written by GRIPS Electronic GmbH, printed from website reported as archived on Feb. 20, 1997 (available at http://web.archive.org/web/19970220165753/www.grips.com/pem.htm).

Player Tracking on Slots, written by GRIPS Electronic GmbH, printed from website reported as archived on Feb. 20, 1997 (available at http://web.archive.org/web/19970220165921/www.grips.com/playtrac.htm).

Peppermillions Game Descrpition printed from www.peppermillreno.com/gaming/promotions/peppermillions, prior to Nov. 9, 2007.

Wiser, "Running the Floor," Nov. 2005, Strictly Slots, pp. 22-25.

MGM Grand Hotel & Casino: Holiday Gift Shoppe, printed from www.mgmgrand.com on Feb. 17, 2010, 1 page.

Players Club Holiday Gift Shoppe 2010, printed from www.playersclub.com on Feb. 17, 2010, 2 pages.

Players Club Holiday Gift Shoppe Promotional Rules, printed from www.playersclub.com on Feb. 17, 2010, 2 pages.

* cited by examiner

GAMING SYSTEM AND METHOD PROVIDING THIRD PARTY PROMOTIONS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Monetary credits or dollars are a known form of currency implemented in gaming establishments or casinos. Gaming machines enable players to play primary or base games in exchange for wagering such monetary credits or dollars. In these gaming machines, the amount of monetary credits or dollars placed as the wager on the primary game may vary based on the denomination of the gaming machine, the maximum number of credits which can be wagered on the gaming machine, or both. For instance, such gaming machines enable players to wager a minimum number of credits, such as one credit (e.g., one penny, nickel, dime, quarter or dollar) up to the maximum number of credits, such as five credits. Thus, known gaming machines enable players to make wagers of substantially different monetary credit or dollar amounts on each play of the primary or base game.

Player tracking points are another known form of currency implemented in gaming establishments or casinos. A player tracking system typically maintains such player tracking points. Known player tracking systems enable such gaming establishments to recognize the value of customer loyalty by identifying frequent and/or high wagering players and rewarding those players for patronage to the casino. Known player tracking systems generally include a player database which stores a cumulative history of a particular player's gaming activity, such as wager amounts. Casinos typically target individual players with direct marketing promotions or customized reward plans based on the player's historical gaming activity. In known player tracking systems, the casino issues each participating player a player identification card (e.g., a player tracking card). The player tracking card has an encoded player identification or player tracking account number that uniquely identifies the player. When a participating player sits down at a gaming device, the player inserts the player tracking card into a card reader. The card reader reads the player tracking card and causes information or data to be sent to a player tracking system to identify the player and the player's player tracking account. The gaming machine sends the player tracking system information or data relating to the credit amounts of the identified player's wagers. The player tracking system provides player tracking points to the player's player tracking account based on such wagered amounts. The player can redeem any accumulated player tracking points for a variety of rewards or prizes. For example, the player may redeem such player tracking points for show tickets, hotel rooms, food coupons, merchandise, or another item determined or offered by the casino.

Certain proposed promotions target players for specific advertisements. In such proposed promotions, an advertisement is targeted to a player based on the player's player tracking information or game play parameters, such as a total amount of the player's wagers. Generally, a player must perform a specific task (such as switching telephone providers) to receive compensation or a benefit (such as discounted phone service). In one form of such promotion, a player receives a higher payout or a free game at a gaming machine for agreeing to view such advertisements while the player plays the gaming machine.

Another proposed promotion tailors specific advertisements or offers to a player based on player tracking information. In this proposed promotion, a modeling algorithm analyzes the player tracking information to tailor specific advertisements or offers to certain players.

Certain other proposed promotions require a player to commit to an obligation associated with a third party offer in order to receive a benefit. In such proposed promotions, the player is presented an offer (such as extra credits) at a gaming machine. For the player to receive the offer, the player has to commit to an obligation to a third party (such as applying for a credit card). The third party subsidizes the cost of the offer in this type of promotion. In one form, these offers are made to a player at a time the player is likely to accept viewing an advertisement, such as when the player's credit meter is nearing zero. In another form, the player is required to trade player tracking points in exchange for receiving the benefit associated with the advertised offer. Both forms require the player to commit to an obligation (e.g., by cashing in player tracking points, applying for a credit card, or answering a questionnaire) to receive the third party benefit.

Certain proposed promotions enable players to exchange monetary credits or dollars won at a gaming machine for prizes. In such promotions, players can typically exchange wins at the gaming machine for a third party prize, such as a piece of clothing, an automobile, or another non-monetary prize. In one form, players view advertisements for available prizes and choose whether to exchange the player's winnings for one of the advertised prizes.

Another proposed promotion enables players to redeem player tracking points for a promotional award or item. In this promotion, players accumulate player tracking points through activities associated with a casino. The players can exchange such player tracking points for promotional awards directly associated with a sponsor or third party. In one form, a player earns player tracking points by viewing advertisements associated with the sponsors. This proposed gaming system provides a player with an alternative way to earn and redeem the player's player tracking points.

Certain proposed promotions employ separate sponsor awards awarded to the player in exchange for the player viewing an advertisement on a display of a gaming machine. In one form, the advertisement is displayed to the player each time the gaming machine is to provide an award to that player. In such proposed promotions, a separate sponsor award paytable is associated with sponsor awards. When the gaming machine determines that a sponsor award is to be awarded, the gaming machine selects the prize from the sponsor award paytable (which is separate from the base game paytable). Such prizes are awarded in conjunction with a normal base game prize. In one form, the gaming machine (or gaming system) maintains the sponsored awards or the sponsor award paytable separate and apart from the regular base game paytable (which may or may not include bonus awards). This enables the standard base game to maintain its standard payout percentage. The gaming machine (or gaming system) also enables the sponsored paytables to be modified or exchanged for different paytables including different sponsors, different advertisements, and/or different prizes for an existing sponsor. Such proposed promotions enable a player to earn additional prizes in exchange for being subject to viewing advertisements on displays of gaming machines.

Certain proposed promotions provide players with two types of player tracking points. A first type includes traditional player tracking points. A second type includes player tracking points redeemable only for merchandise. Both of these types of points are provided by the casino, and thus paid for by casino marketing dollars. In one proposed promotion, players can earn gift points throughout a designated time period and redeem these gift points for specific merchandise during a designated shopping period. A player is able to exchange any accumulated gift points to obtain such merchandise. In this proposed promotion, a player is not able to obtain merchandise if the player does not have enough gift points. Since the proposed promotion provides specifically marked player tracking points, which are funded by the casino, the casino sees no additional revenue (and possibly a loss) from this type of promotion. In one form, the casino must purchase or furnish merchandise from suppliers which can represent a further cost to the casino associated with these types of proposed promotions.

The gaming systems and promotions described above have not been commercially viable or implemented into existing casino infrastructure with any consistency or commercial success. Although such systems or promotions enable casino players to obtain a third party or sponsor award based on play (or other activity) at gaming machines in a casino; many of these gaming systems and promotions often require the player to do or be subjected to an extra activity which can take away from the player's gaming experience. Additionally, players are often required to surrender player tracking points to obtain the third party or sponsor awards. In such proposed systems or promotions the player tracking points are funded by the casino; thus, the casino sees no additional revenue through third party advertisements. A need thus exists to establish a structured gaming or promotional system and method that enables casinos and other gaming establishments to generate additional revenue by providing third party advertisers access to the specific and refined customer data typically maintained by player tracking systems directly at gaming machines associated with the casino.

Certain proposed promotions described above provide the player with a third party award immediately (through the casino) or with an award associated with the casino. Such promotions do not require the player to patronize a third party, such as an advertiser or sponsor. Additionally, a need exists for a system and method which creates specific incentives for players to patronize such third party advertisers after the players leave the casino. A need also exists for a system and method which provides advertisers or sponsors with a way to advertise to casino players in a manner that entices such players to patronize the advertisers or sponsors at a later time.

There is a continuing need to provide new and different gaming machines and gaming systems as well as new and different ways to provide promotions including third party promotions at a low cost. There is also a continuing need to provide certain players (e.g., players of a high level or status) with higher level awards while not affecting the player's player tracking points or status.

SUMMARY

The gaming system and method disclosed herein enable players to earn third party awards at gaming machines without causing a noticeable burden to the players or the casinos. The gaming system and method enable players to earn third party awards without requiring the players to sacrifice or surrender the player's player tracking points. The gaming system and method also provide value to players without the casino absorbing the cost of such value. In various embodiments, the gaming system and method disclosed herein creates a new type of promotional currency redeemable for a good or service (or a discount on a good or service) associated with a point-of-sale independent of the casino (i.e., a third party point-of-sale). In one embodiment, the promotional currency does not cost the casino or the player anything.

In one embodiment, the disclosed system and method enables the casino to work in conjunction with a third party advertiser or sponsor to create specifically marked promotional currency that can be earned and redeemed by players of gaming machines in the casino. In one embodiment, an advertiser or sponsor (i.e., a third party to the casino) funds the cost associated with such promotional currency. In certain embodiments, the promotional currency is in a form of units of discount, such as discount tokens or discount coupons, which can be exchanged for a discount on a good or service made, distributed or offered by the advertiser or sponsor.

In such embodiments, the gaming system and method enables casinos and other gaming establishments to offer players additional awards at no additional cost. In one embodiment, the advertiser or sponsor will pay the casino for the opportunity to market products, goods or services to the casino's players. For example, the casino sells or leases dedicated space on a display of one or more gaming machines in the casino to an advertiser or sponsor. The advertiser or sponsor provides content, such as advertisements for products, goods, or services for display within the space. In one embodiment, any discount tokens or promotional currency earned or accumulated by a player are displayed in the dedicated space. In various embodiments, the discount tokens are redeemable at the advertiser or sponsor for discounting or purchasing such products, goods, and services.

In one embodiment, the system and method provides additional revenue to the casino and additional benefits to the players at no cost by providing the promotional currency. In one embodiment, the promotional currency is funded by one or more advertisers or sponsors. In this embodiment, the casino does not fund the promotional currency with casino marketing dollars. The promotional currency enhances the player's game experience and player tracking account by not funding the promotional currency with the player's player tracking points.

In one embodiment, a third party advertiser or sponsor, such as ABC watch company, works in conjunction with the casino to create 200 units of promotional currency (e.g., ABC watch company dollars, points or discount tokens). One or more players accumulate or use the ABC discount tokens through plays of a game at one of the gaming machines. Each ABC watch discount token can be exchanged for a gift certificate, ticket or coupon towards a high value watch sold, manufactured or distributed by the ABC watch company. In one embodiment, the player is not able to accumulate or use enough ABC watch discount tokens to cover the total cost of the ABC watch. That is, ABC discount tokens can be used to discount an ABC watch but not buy the watch without a further payment. Accordingly, the system and method disclosed herein causes revenue to be provided to the advertiser or sponsor as a direct result of an advertising cost paid to the casino to market to the casino's players. Additionally, the promotional currency disclosed herein benefits advertisers or sponsors by encouraging such players to patronize the advertiser or sponsor to redeem any accumulated promotional currency.

In one embodiment, the gaming system enables the casino to fund the promotional currency to provide additional value to players. In this embodiment, the advertiser or sponsor pays a fee to the casino for affiliation with the promotional currency. In exchange for the fee, the casino provides advertisement content relating to a good or service associated with the advertiser or sponsor to players at gaming machines in the gaming system. For example, ABC watch company pays a casino a fee of $10,000 to be affiliated with ABC watch dollars or discount tokens. Based on different events, the gaming system enables the players to accumulate ABC watch dollars or discount tokens. The fee offsets (at least partially) costs incurred by the casino to provide the promotional currency affiliated with a designated advertiser or sponsor (e.g., ABC watch dollars or discount tokens).

In one embodiment, the promotional currency expires after a certain amount of time. For example, the currency expires 30 days after being earned by a player on a rolling basis if not used. Providing promotional currency which expires enables the advertiser or sponsor to better control how much promotional currency can be accumulated by the players. For example, the advertiser or sponsor controls discounted amounts provided by the promotion by limiting the amount of promotional currency available to be accumulated by the players. In this example, the gaming system inhibits players from accumulating enough promotional currency to purchase a good or service offered by the advertiser or sponsor. In another example, the gaming system inhibits players from accumulating enough promotional currency to purchase a good or service offered by the advertiser or sponsor below a wholesale cost.

In one embodiment, the gaming system enables different promotional currencies to be provided to different players. The different players can be distinguished from one another based on a characteristic, such as the game or gaming machine being played by the players, the players' player tracking ranking, any promotion status associated with the players' player tracking cards, the players' recent gaming sessions, or any other suitable data. For example, a first promotional currency is provided to players of a first player status (e.g., gold status as determined by a suitable player tracking system) and a second promotional currency is provided to players of a second player status (e.g., platinum status as determined by a suitable player tracking system). In this embodiment, advertisers or sponsors can target player having different characteristics to improve the effectiveness of the advertised or sponsored promotion.

The gaming system and method disclosed herein enables casinos and other gaming establishments to cooperate with advertisers, sponsors, and retailers to directly target or market to players of the gaming machines in the gaming system. Targeting or marketing to specific consumers is a problem faced by many advertisers, sponsors, and retailers. The gaming or promotional system and method disclosed herein enables casinos and other gaming establishments to generate additional revenue by providing advertisers, sponsors, and retailers access to specific and refined customer data, such as data typically maintained by player tracking systems. Access to such specific and refined customer data enables advertisers, sponsors, and retailers to more effectively and efficiently market products, goods, and services to players of the gaming machines in the gaming system.

Additional features and advantages are described herein, and will be apparent from, the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment.

In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
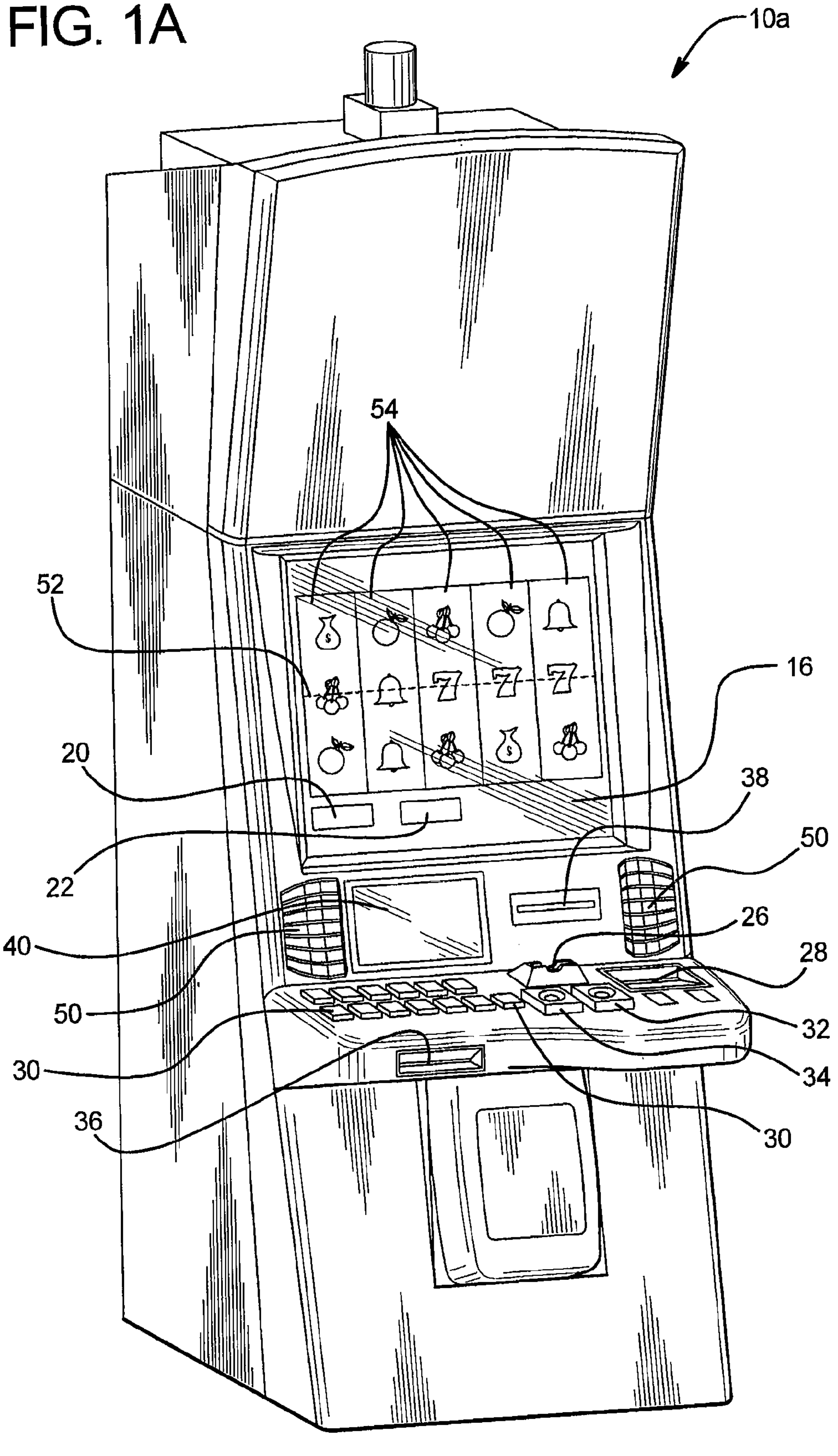
FIG. 1A is a front-side perspective view of one embodiment of the gaming device disclosed herein.
Figure 1B:
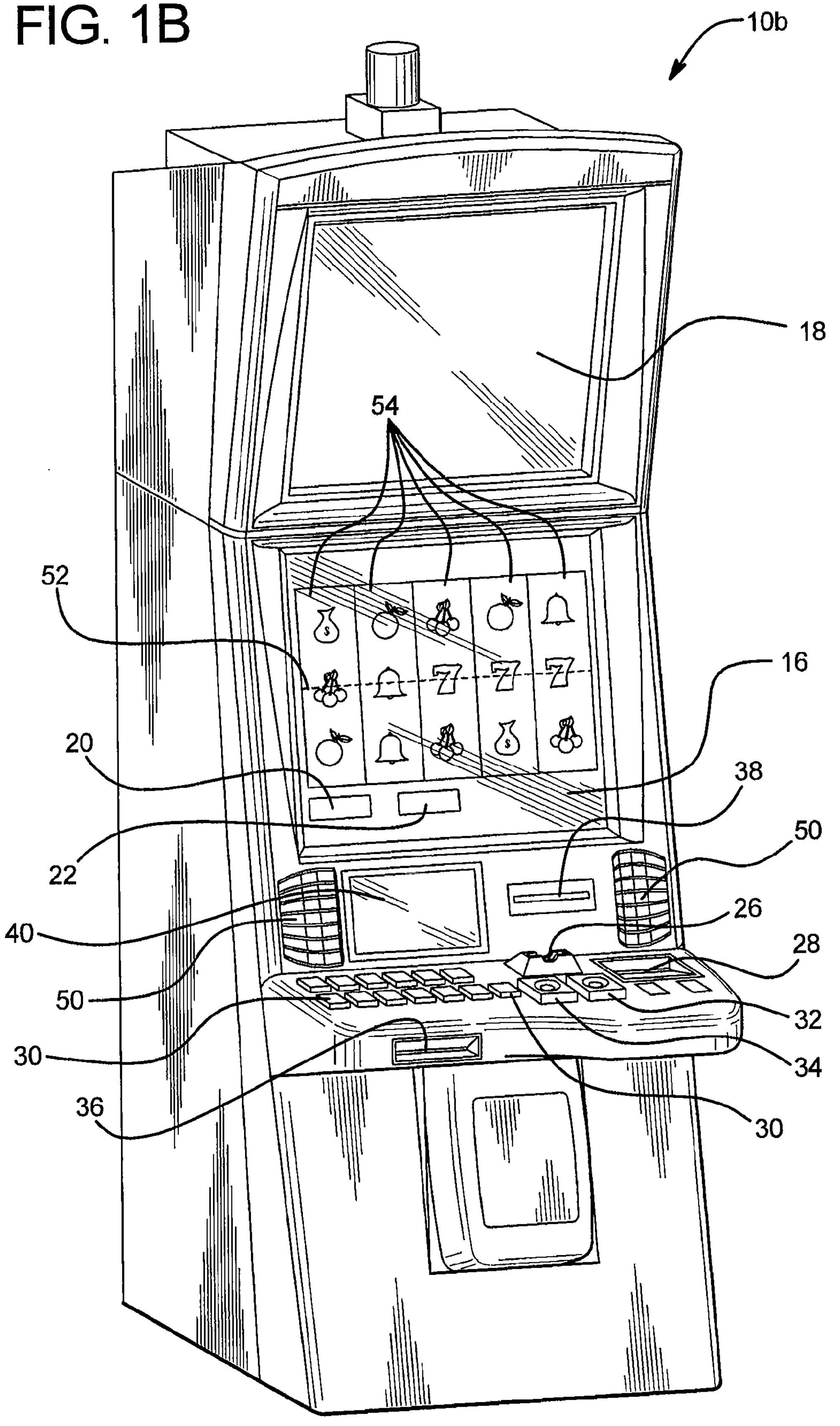
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
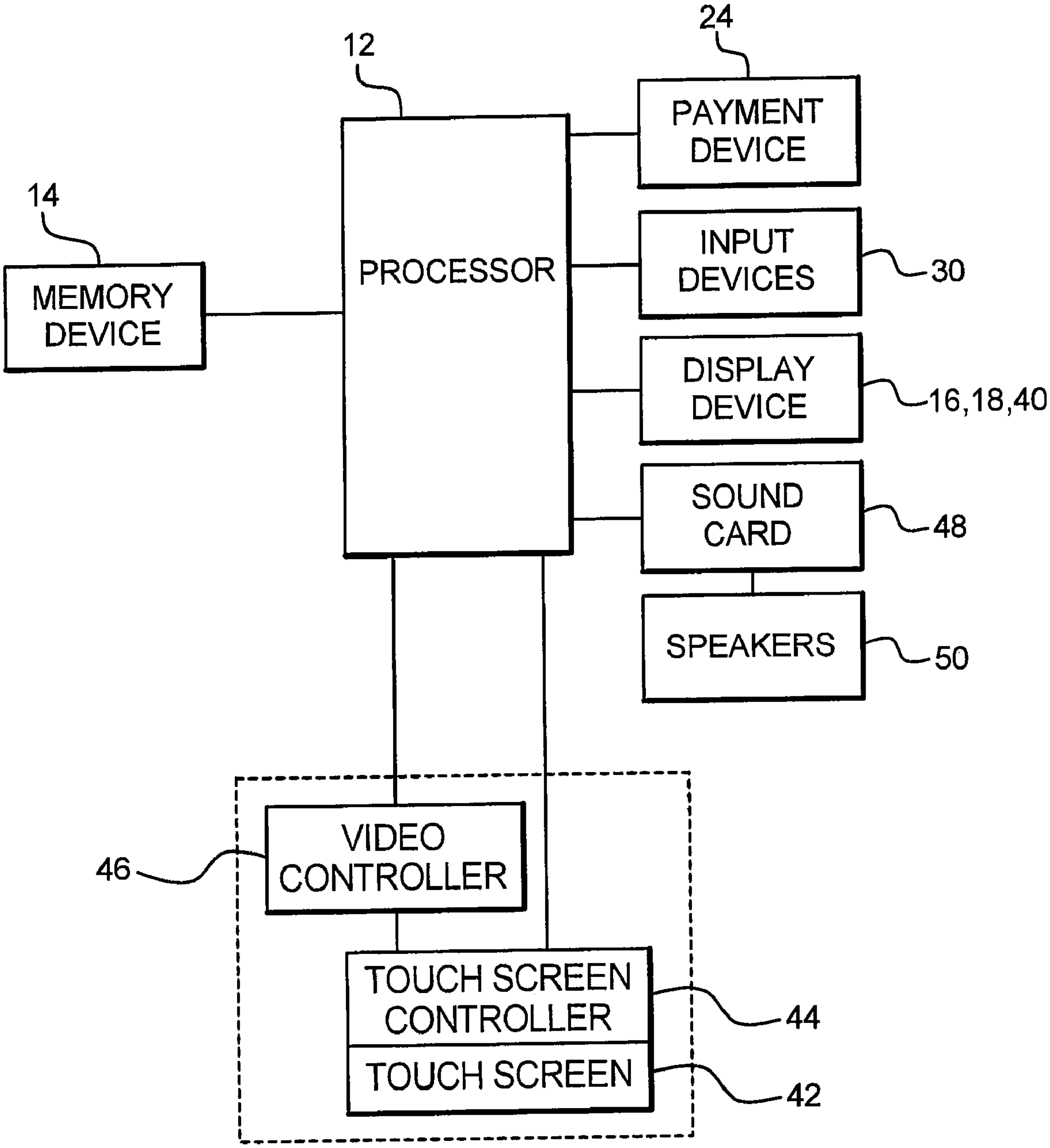
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surfaceconduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
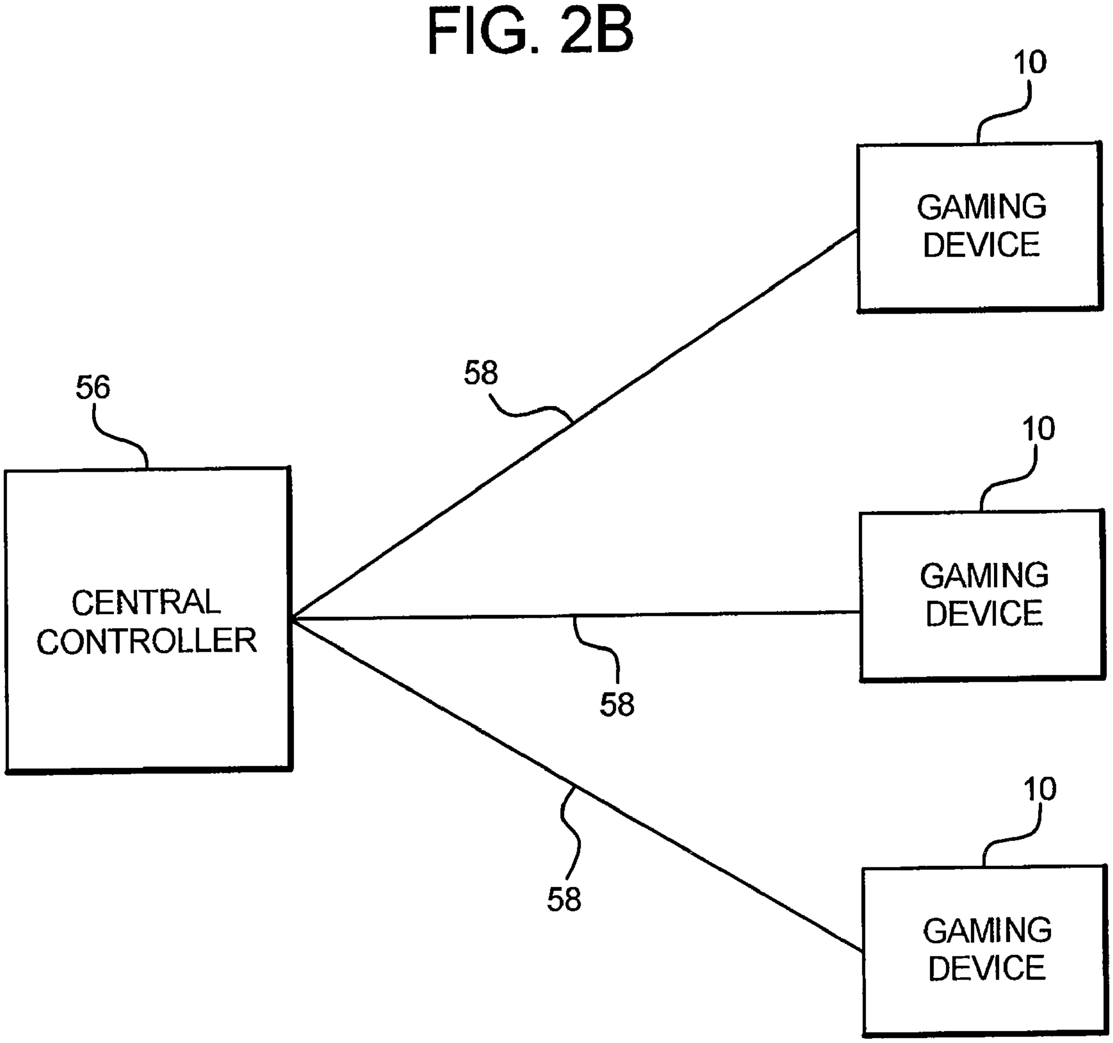
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

Third Party Promotion and Currency

In one embodiment, the gaming system and method disclosed herein enable players to earn advertised or sponsored awards at gaming machines without requiring the players to sacrifice or surrender the player's player tracking points. Thus, the gaming system and method provide value to players at little or no cost to a gaming establishment, such as a casino. In various embodiments, such advertised or sponsored awards are funded by advertisers or sponsors (i.e., a third party to the casino and player) and do not cost the casino or the player anything. The gaming system and method disclosed herein associates a new type of promotional currency with third party advertisers or sponsors (i.e., a third party currency). In one embodiment, the gaming system and method associates each advertiser or sponsor with specifically marked currency. For example, the gaming system and method associates ABC watch company with ABC watch currency (e.g., in a form of ABC watch discount tokens, ABC watch points, or ABC watch dollars). The gaming system and method associates XYZ car company with XYZ car currency (e.g., in a form of XYZ car discount tokens, XYZ car points, or XYZ car dollars). The system and method enable players to accumulate such ABC watch currency or XYZ car currency based on events or activity associated with a primary or bonus game at one of the system gaming machines. In this example, the system and method enable the players to redeem any accumulated XYZ car currency for a discount on a XYZ car, a XYZ car product, or a XYZ car service at a point-of-sale associated with the XYZ car company.

Figure 3:
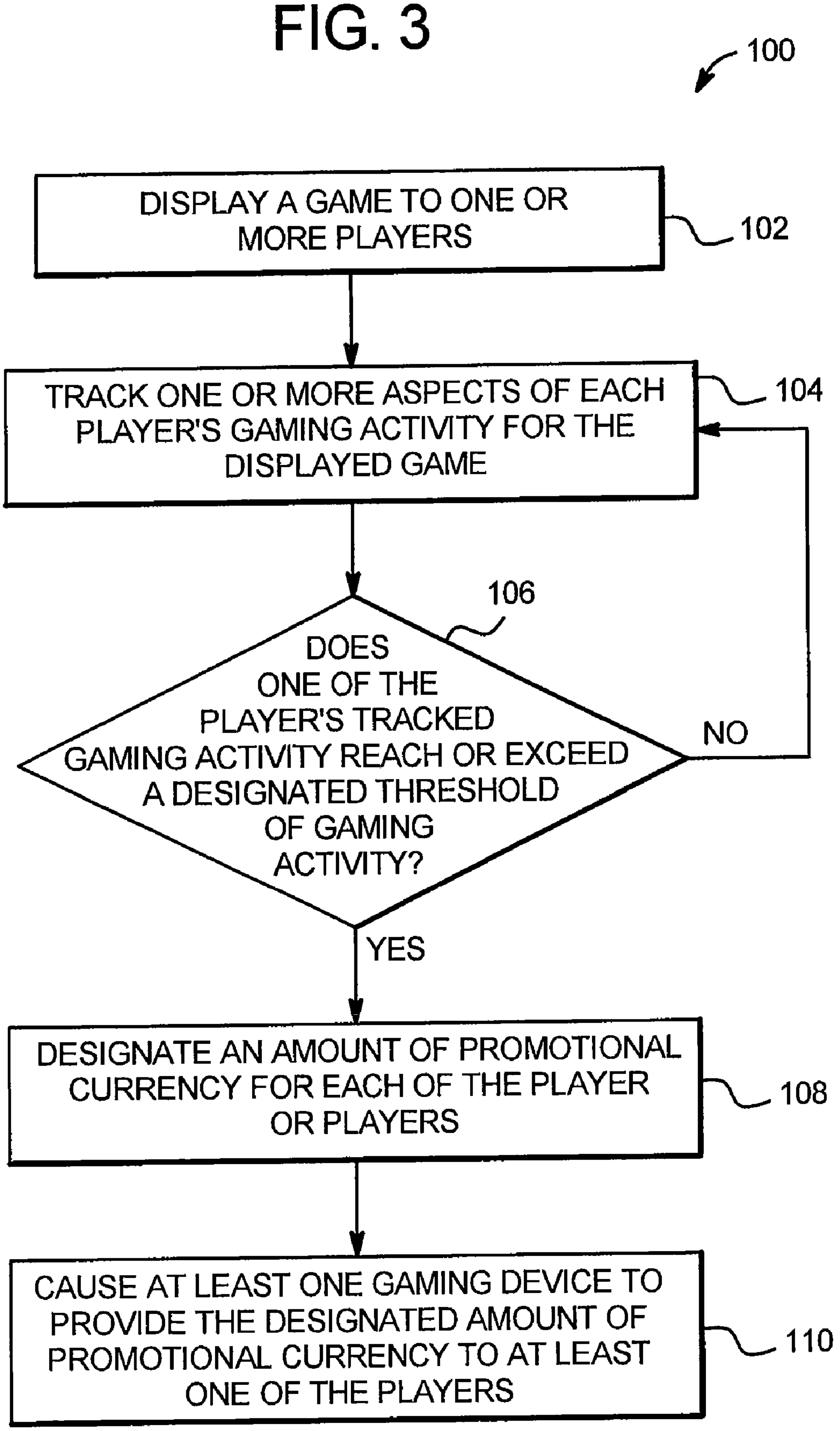
FIG. 3 is a flowchart of an example process for one embodiment of the gaming system and method disclosed herein, which enables players to win promotional currency redeemable for a discount on a good or service at an advertiser or sponsor.

Referring now to FIG. 3, a flowchart of an example process 100 for enabling a plurality of players to each win one or more advertised or sponsored awards. In one embodiment, the process 100 is embodied in one or more software programs stored in one or more memories and executable by one or more processors, such as the controller of the gaming system. Although the process 100 is described with reference to the flowchart illustrated in FIG. 3, it should be appreciated that many other methods of performing the acts associated with process 100 may be used. For example, the order of many of the blocks may be changed, and many of the blocks described may be optional.

In one embodiment, the process 100 is embodied in computerized instructions executed by a controller or remote host. In such a "thin client" embodiment, the controller remotely controls any games (or other suitable interfaces) and the gaming device is utilized to display such games (or suitable interfaces) and receive one or more inputs or commands from a player. In another embodiment, the process 100 is embodied in computerized instructions that are communicated from the controller or remote host to a gaming device local processor and memory devices. In such a "thick client" embodiment, the gaming device local processor executes the communicated computerized instructions to control any games (or other suitable interfaces) provided to a player.

The process 100 enables a central server or controller to cause the system gaming devices to display a game, such as a primary game or a bonus game, as indicated by block 102. In one embodiment, one of the system gaming devices displays a primary game after a player at the gaming device places a wager. The gaming system tracks one or more aspects of each player's gaming activity for the displayed game, as indicated by block 104.

In one embodiment, the central server or controller is in communication with one or more of the gaming devices for monitoring purposes only. That is, each individual gaming device randomly generates the game outcomes provided to the player and the central server or controller monitors the activities and events occurring on the plurality of gaming devices, as indicated by block 104. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, a plurality of the gaming devices in the gaming system are associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device, as indicated by block 104. In one such embodiment, each of the gaming devices includes at least one card reader, such as the card reader 38 illustrated in FIGS. 1A and 1B, in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system tracks any suitable information or data relating to the identified player's gaming session at designated times. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display, such as player tracking display 40 illustrated in FIGS. 1A and 1B. In another embodiment, such tracked information and/or any suitable feature associated with the player tracking system is displayed via one or more service windows, as will be described in greater detail below, which are displayed on the central display device and/or the upper display device.

With continued reference to FIG. 3, the central controller and/or the gaming device processor determines whether one of the player's tracked gaming activity reaches or exceeds a designated threshold. For example, when a designated player collectively wagers a designated amount (e.g., 500 credits or monetary units) in one or more plays of the game, the central controller designates or allocates an amount of promotional currency for the designated player, as indicated by block 108. In one embodiment, the central controller associates the promotional currency with an advertiser or sponsor and provides the designated amount of promotional currency to the designated player in the form of discount tokens or points. In this embodiment, the discount tokens or points are redeemable at a point-of-sale associated with the advertiser or sponsor. As indicated by block 110, the central controller causes at least one of the gaming devices to provide the designated amount of promotional currency (e.g., 10 discount tokens) to the designated player. That is, in this embodiment, the provided amount of promotional currency (e.g., 10 discount tokens) is specific to the designated player based on the player's tracked gaming activity reaching or exceeding the designated threshold.

It should be appreciated that the central controller tracks the gaming activity for different players in association with the gaming devices. In one embodiment, the central controller provides an amount of promotional currency based on each of the player's tracked gaming activity. In this embodiment, the central controller determines whether any of the players' tracked gaming activity reaches or exceeds a designated threshold. For each player's tracked gaming activity that reaches or exceeds a designated threshold, the central controller causes one of the gaming devices to provide a designated amount of promotional currency (e.g., 10 discount tokens) to that player.

In one embodiment, each discount token is exchangeable for a discount at the associated advertiser or sponsor. For example, the central controller designates each ABC watch discount token with a $100 discount at the ABC watch company. In this example, if a player has accumulated six ABC watch discount tokens, the player is entitled to a $600 discount on a high value watch at the ABC watch company. In one embodiment, the exchange rate for such discount tokens is based on any tracked information and/or any suitable feature associated with the player tracking system, such as the promotion status associated with the player's player tracking card or the player's recent gaming sessions.

In this embodiment, each of the player's six ABC watch discount tokens is entitled to a $100 discount on a high value watch at the ABC watch company. That is, the six ABC watch discount tokens of this example have a redeemable value of $600 at a point-of-sale associated with the ABC watch company. In one embodiment, the discount tokens have no monetary value and are not usable for goods or services offered by the casino. In this way, the promotional currency disclosed herein differs from monetary and player tracking currency currently offered to players at various casinos. It should also be appreciated, that even with the discount, the ABC watch company also earns a profit by selling a watch it may not have otherwise sold.

Figure 4:
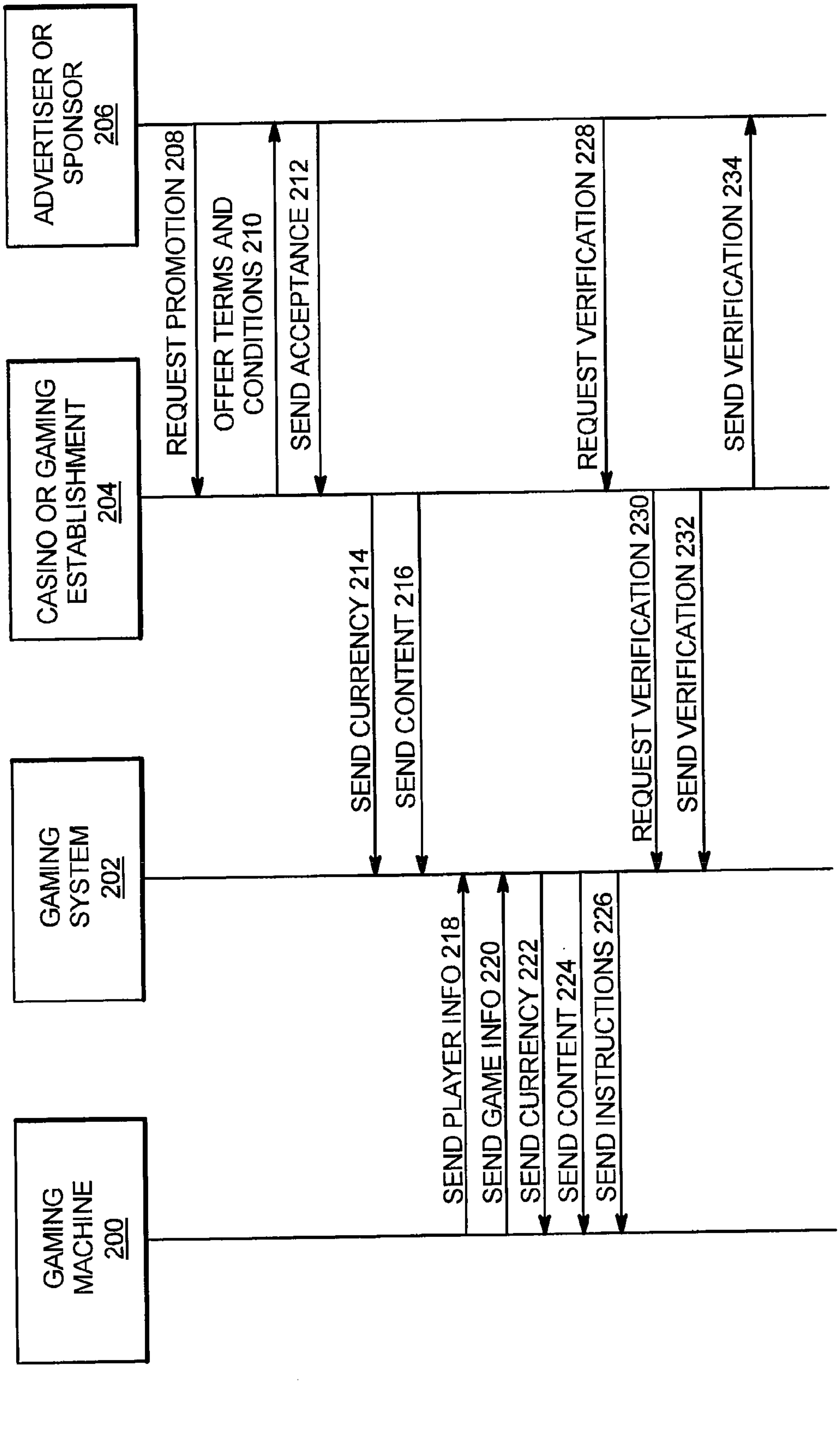
FIG. 4 is a flowchart of an example interaction diagram for one embodiment of the gaming system and method disclosed herein, which illustrates various interactions between the gaming system, a gaming establishment, and an advertiser or sponsor.

In one embodiment as illustrated in FIG. 4, the gaming system and method disclosed herein enable a casino or gaming establishment 204 to establish a relationship with one or more advertisers or sponsors 206 to offer one or more promotions without incurring any additional or substantial cost. The casino or gaming establishment 204 offers each promotion in association with at least one gaming device 200 of the gaming system 202. Each promotion entices or encourages players to patronize retail locations or points-of-sale associated with the advertisers or sponsors 206 and provides an effective and desirable marketing tool for the advertisers or sponsors 206.

In one embodiment, the promotion provides the casino 204 with an opportunity to generate additional revenue by enabling the advertiser or sponsor 206 to target individual players or groups of players at one of the gaming devices 200. The advertiser or sponsor 206 targets certain players based on player data, such as the player profile or other data associated with the player tracking system. In one embodiment, the advertiser or sponsor 206 targets certain players based on the player's spending history or the player's purchasing preferences. The promotion enables third party advertisers or sponsors 206 to offer goods and services for a discounted price to targeted or specific players. In one embodiment, the promotion enables the advertiser or sponsor 206 to (a) directly market or target specific players or player types based on player data or profiles, (b) provide those players with discount units of the promotional currency upon qualifying events, and (c) provide incentive for the players to patronize the advertiser's or sponsor's business in exchange for a discount on a good or service. In this example, providing incentive for the players to patronize the point-of-sale or retail location of the advertiser or sponsor 206 increases the advertiser's or sponsor's chance to realize a return any fees paid for the promotion.

In one embodiment, the casino 204 has a relationship with only one advertiser or sponsor 206. In this instance, all designated players would earn promotional currency associated with the advertiser or sponsor 206. For example, the gaming system associates ABC watch company with ABC watch currency (e.g., in a form of ABC watch discount tokens, ABC watch points, or ABC watch dollars). In other embodiments, the casino 204 has a relationship with a plurality of advertisers or sponsors 206 and provides different promotional currency associated with each advertiser or sponsor 206. For example, the gaming system associates XYZ car company with XYZ car currency (e.g., in a form of XYZ car discount tokens, XYZ car points, or XYZ car dollars) in addition to providing ABC watch currency associated with the ABC watch company. In the above examples, the gaming system enables players to accumulate such ABC watch currency or XYZ car currency based on events or activity associated with a primary or bonus game at one of the system gaming machines. The gaming system enables the players to redeem any accumulated XYZ car currency for a discount on a XYZ car, a XYZ car product, or a XYZ car service at a point-of-sale or retail location associated with the XYZ car company.

In one embodiment, the gaming system manufacturer or another suitable entity brokers the relationship between at least one casino 204 and at least one advertiser or sponsor 206. In this embodiment, the broker negotiates separate terms and conditions with one or more casinos 204 and one or more advertisers or sponsors 206. For example, each advertiser or sponsor 206 pays a fee to the broker for the right to (i) advertise to players of at least one designated casino 204, and/or (ii) be affiliated with any promotional currency offered by at least one designated casino 204. In this example, the broker pays a fee to one or more casinos 204 for (i) space on gaming machines of that casino 204 to display advertisements, and/or (ii) targeted access to players of that casino 204. That is, in this example, the broker charges a fee (e.g., paid by the advertiser or sponsor) for acting as a liaison between the casino(s) 204 and advertiser(s) or sponsor(s) 206. The brokered relationship between the casino 204 and the advertiser or sponsor 206 enables the casino 204 to provide additional value (e.g., in the form of advertisements and promotions) to its players at a lower cost and enables the advertisers or sponsors 206 to advertise goods and services to a broad player base or to a targeted player base at one or more casinos 204.

In one embodiment, once the relationship between the casino 204 and the advertiser or sponsor 206 is established, information may be exchanged regarding a promotion. In the interaction diagram illustrated in FIG. 4, the advertiser or sponsor 206 sends a request to the casino or gaming establishment 204 to begin a promotion. In another embodiment, the advertiser or sponsor 206 sends a request to the casino or gaming establishment 204 to join an existing promotion. Upon receiving such request, the casino 204 offers terms and conditions 210 to the advertiser or sponsor 206.

In one embodiment, the terms and conditions 210 include different parameters of the promotion, such as a promotional currency. In this embodiment, the casino 204 works in conjunction with each advertiser or sponsor 206 to create specifically marked currency that can be earned and redeemed by players of the system gaming machines 200. The promotional currency is redeemable for products, goods or services made, distributed or offered by the advertiser or sponsor 206 (or discounts on such products, goods, or services).

In one embodiment, the terms and conditions 210 attribute the cost associated with the promotion to the advertiser or sponsor 206. That is, the promotional currency is funded by the advertiser or sponsor 206 and not by the casino 204. In this embodiment, the casino 204 can offer the promotion to players of the gaming system 202 without funding the promotion with either casino marketing dollars or player tracking points. The promotional currency is redeemable for products made, distributed or sold by the advertiser or sponsor 206. In one embodiment, the advertiser or sponsor 206 is associated with a point-of-sale or retail location where the promotional currency can be redeemed.

In various embodiments, the promotional currency is a unit of discount or discount token associated with a third party vendor, such as the advertiser or sponsor 206. In one such embodiment, the promotional currency discounts a product, good or service made, distributed or offered by the advertiser or sponsor 206. It should be appreciated that the promotional currency can take any form, such as a chip or token, a ticket or coupon printable at one of the gaming devices, or any suitable electronic form. In one embodiment, the promotional currency is printable at the gaming devices in ticket or coupon form at a player's request (e.g., on player demand). In one embodiment, the promotional currency is defined by the casino. In another embodiment, the promotional currency is defined by the advertiser or sponsor and is unique to and based upon the specific requirements of the promotion or advertisement. For different embodiments, the type or form of the promotional currency is configurable based upon the requirements of the promotion.

In one embodiment, the terms and conditions 210 require the advertiser or sponsor 206 to pay a fee to advertise products, goods, or services to a player at the gaming machine 200. For example, the player earns a designated amount of the promotional currency based on a qualifying event, such as each time the player reaches an award threshold. In another embodiment, the terms and conditions 210 require the advertiser or sponsor 206 to pay a commission to the casino 204 each time a player redeems the player's promotional currency for a product, good, or service associated with the advertiser or sponsor 206. For example, the advertiser or sponsor 206 pays the casino 204 a commission for sales of products, goods, or services generated by the promotion.

In one embodiment, the terms and conditions 210 require the advertiser or sponsor 206 to pay the casino 204 a set amount (e.g., a flat fee) to advertise to a designated group of players for a set amount of time. For example, ABC watch company pays $10,000 to advertise to platinum and gold players (as designated by the player tracking system) for a period of a year. In one embodiment, the fee would offset the cost of advertisements displayed to players.

In another embodiment, the terms and conditions 210 require the advertiser or sponsor 206 to pay the casino 204 per impression or advertisement displayed. That is, the advertiser or sponsor 206 pays a set fee to the casino 204 for each advertisement displayed to a player instead of paying a flat fee for displaying advertisements over a designated period of time. In different embodiments, the fee charged to the advertiser or sponsor 206 for each impression or advertisement is based on the player's profile or status (as determined by the player tracking system), based on an amount of coin-in played by the player, based on the player's award (such as an amount won reaching a designated threshold), based on the qualifying event for earning a designated amount of the promotional currency, or based on any other suitable factor.

In one embodiment, the terms and conditions 210 require the advertiser or sponsor 206 to pay the casino 204 for promotional currency redeemed at the point-of-sale or retail location associated with the advertiser or sponsor 206. For example, the advertiser or sponsor 206 pays the casino a designated percentage or other suitable fee based on the promotional currency redeemed at the point-of-sale or retail location associated with the advertiser or sponsor 206. In another example, the advertiser or sponsor 206 pays the casino a designated fee based on the goods or services rendered at the point-of-sale or retail location associated with the advertiser or sponsor 206 in conjunction with the promotional currency. That is, in this embodiment, the advertiser or sponsor 206 pays a fee or commission for the displayed advertisements which resulted in a sale of an advertised good or service and does not pay a fee per impression or advertisement displayed.

In one embodiment, the terms and conditions 210 require the advertiser or sponsor 206 to set aside a specific amount of funds to be made available as promotional currency for the player to earn during the promotion. For example, the advertiser or sponsor 206 sets aside $15,000 for the promotional currency, which can be earned and redeemed by the players. In this embodiment, the casino 204 may or may not charge a fee to the advertiser or sponsor 206.

In one embodiment, the terms and conditions 210 include an accumulation rate for the promotional currency and/or an exchange rate for the promotional currency at a point-of-sale associated with the advertiser or sponsor 206.

In one embodiment, the terms and conditions 210 include one or more verification methods for the advertiser or sponsor 206 to confirm or verify an amount of promotional currency accumulated by a player and redeemable at the point-of-sale. It should be appreciated that any suitable term or condition can be negotiated between the casino 204 and the advertiser or sponsor 206.

In response to the casino 204 and the advertiser or sponsor 206 agreeing to the terms and conditions 210, the advertiser or sponsor 206 sends confirmation or acceptance of the promotion 212. In one embodiment, the confirmation or acceptance 212 includes content, such as advertisements or impressions. In different embodiments, the content varies by advertiser or varies based on a parameter, such as wager amounts by players or player profiles.

Referring back to FIG. 4, the casino 204 sends currency 214 and content 216 associated with each of the advertisers or sponsors 206 and sends the currency 214 and content 216 to the gaming system 202. In one embodiment, the content 216 includes one or more advertisements or impressions having a parameter such as length or format. Each gaming machine or device 200 sends the gaming system 202 both player information 218 and game information 220. In one embodiment, the player information 218 and game information 220 are associated with any suitable information, data or activity, such as any amounts wagered, average wager amounts and/or the time these wagers are placed, tracked in association with the player tracking system.

Based on the tracked information, the gaming system 202 sends currency 222, content 224 and instructions 226 to the gaming machines or devices 200. For example, if a player's tracked gaming activity reaches or exceeds a designated threshold. In this example, when a player wagers a designated amount (e.g., 500 credits or monetary units) in one or more plays of a game, the central controller designates an amount of promotional currency for the player. In one embodiment, the central controller sends instructions 226 to the gaming machines or devices 200 regarding the designated amount of player wagers and the designated amount of promotional currency associated with those wagers.

In one embodiment, the gaming system associates each impression or advertisement with the promotional currency. For example, the gaming device displays an impression to the player related to XYZ car company and provides the player with a designated amount of XYZ car promotional currency. In one embodiment, the gaming device displays the impression and provides the promotional currency at the same time (or substantially the same time). In another embodiment, the gaming device displays the impression at a designated time after providing any promotional currency to the player.

In different embodiments, the parameters and/or costs for each impression or advertisement vary. In one embodiment, the cost of a designated impression is based on one or more of the parameters. Examples of parameters associated with an impression include, but are not limited to: a size of the impression, an audience of the impression, graphics, video or audio used in the impression, a length of the impression, a location of the impression, or any other suitable parameter. For example, an impression lasting 30 seconds may cost more than an impression lasting 10 seconds. Similarly, a large impression with detailed graphics, video or audio may cost more than a small impression with less detailed graphics, video or audio. It should be appreciated that any suitable manner of displaying, providing, and pricing advertisements or impressions may be implemented in accordance with the gaming system disclosed herein.

In one embodiment, the gaming system selects one or more parameters for a displayed impression based on different events, such as an amount of promotional currency won by the player, a player profile of the player, or any other suitable factor. In one example, a player wins a first amount of promotional currency (e.g., 5 discount tokens) and the gaming system causes a display of a first impression to the player. If the player wins a second, larger amount of promotional currency (e.g., 10 discount tokens), the gaming system causes a display of a second impression to the player. In one embodiment, the second impression is larger, lasts longer, and includes a more detailed audio/visual exhibition than the first impression. In another embodiment, the second impression is associated with an advertiser or sponsor with higher valued goods or services than an advertiser or sponsor associated with the first impression.

In one embodiment, the gaming system selects one or more parameters for a displayed impression based on the profile of the player. In one example, the gaming system displays an impression for thirty seconds to platinum players (who are more likely to buy the product), but only displays the impression for ten seconds to bronze players (who are less likely to buy the product). In another embodiment, the gaming system displays different impressions with the same or different parameters to player of different player profiles or statuses. For example, an impression for ABC watch company is displayed for thirty seconds to bronze players and an impression for XYZ car company is displayed to platinum players for thirty seconds.

In one embodiment, the gaming system 202 displays one or more impressions to designated players. For example, ABC watch company advertises with the casino to advertise to players with designated amounts of coin-in (e.g., $1000 coin-in per day) or designated player profiles or statuses (e.g., only gold players). This direct marketing enables the ABC watch company to advertise to designated players, such as those with high levels of disposable income or with targeted purchasing preferences.

In one embodiment, the gaming system 202 enables players to select a good or service for which to accumulate promotional currency. For example, the gaming system 202 causes a plurality of goods or services associated with one or more advertisers or sponsors 206 to be displayed by the gaming machines 200 being played by the players. The gaming system 202 and/or the gaming machines 200 enable the players to select one or more of the goods or services for which to accumulate promotional currency. In one embodiment, the promotional currency accrues at different rates for different goods or services. In another embodiment, the amount of promotional currency accrued varies for different goods and services. In such embodiments, the rate at which any promotional currency accumulates and/or the amount of promotional currency accrued for a designated good or service is defined by the terms and conditions 210 between the casino 204 and the advertiser or sponsor 206.

Figure 5A:
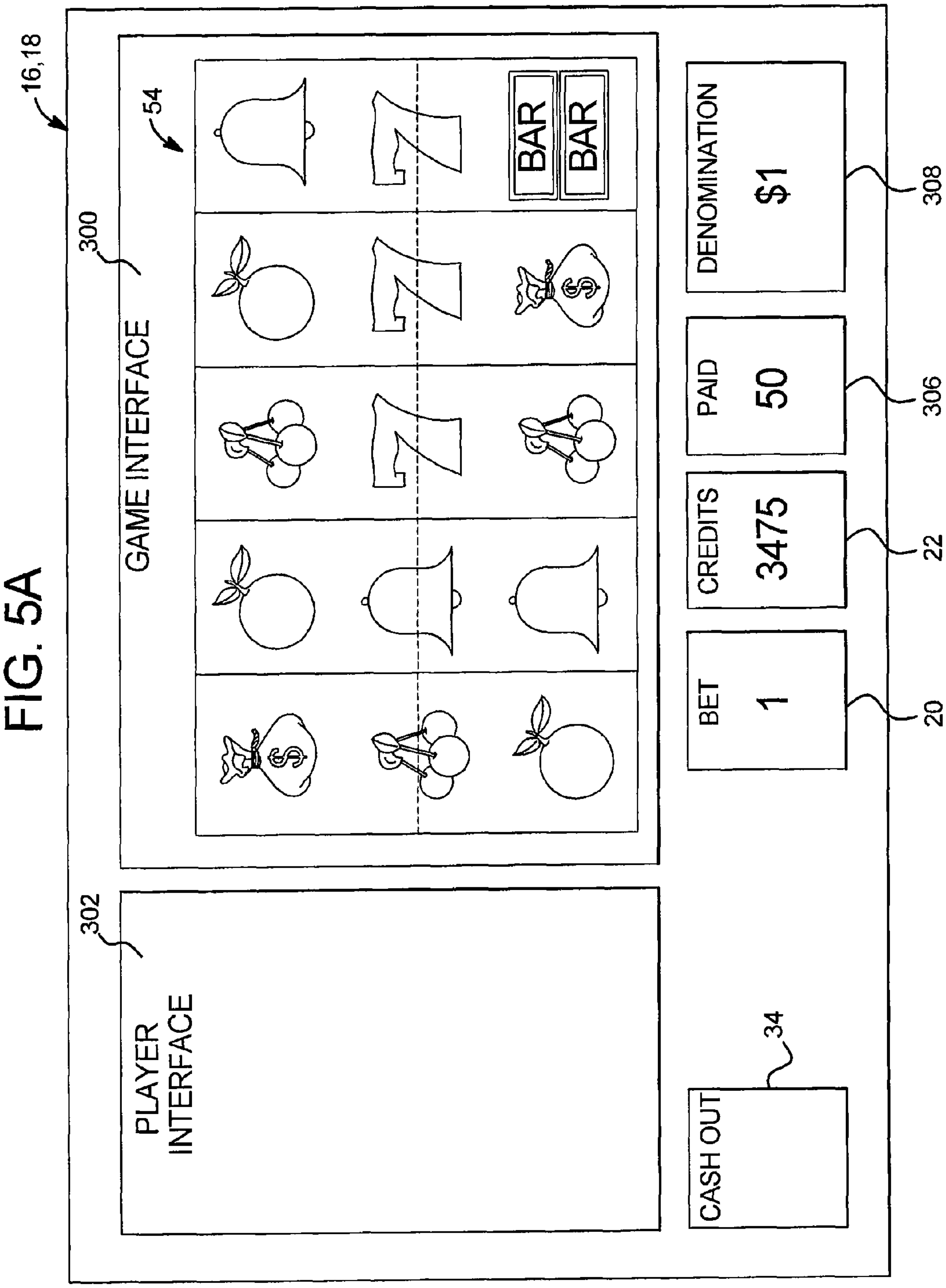
FIGS. 5A, 5B, and 5C are top plan views of a display device of one of the gaming devices of one embodiment of the gaming system disclosed herein illustrating a game interface and a player interface.
Figure 5B:
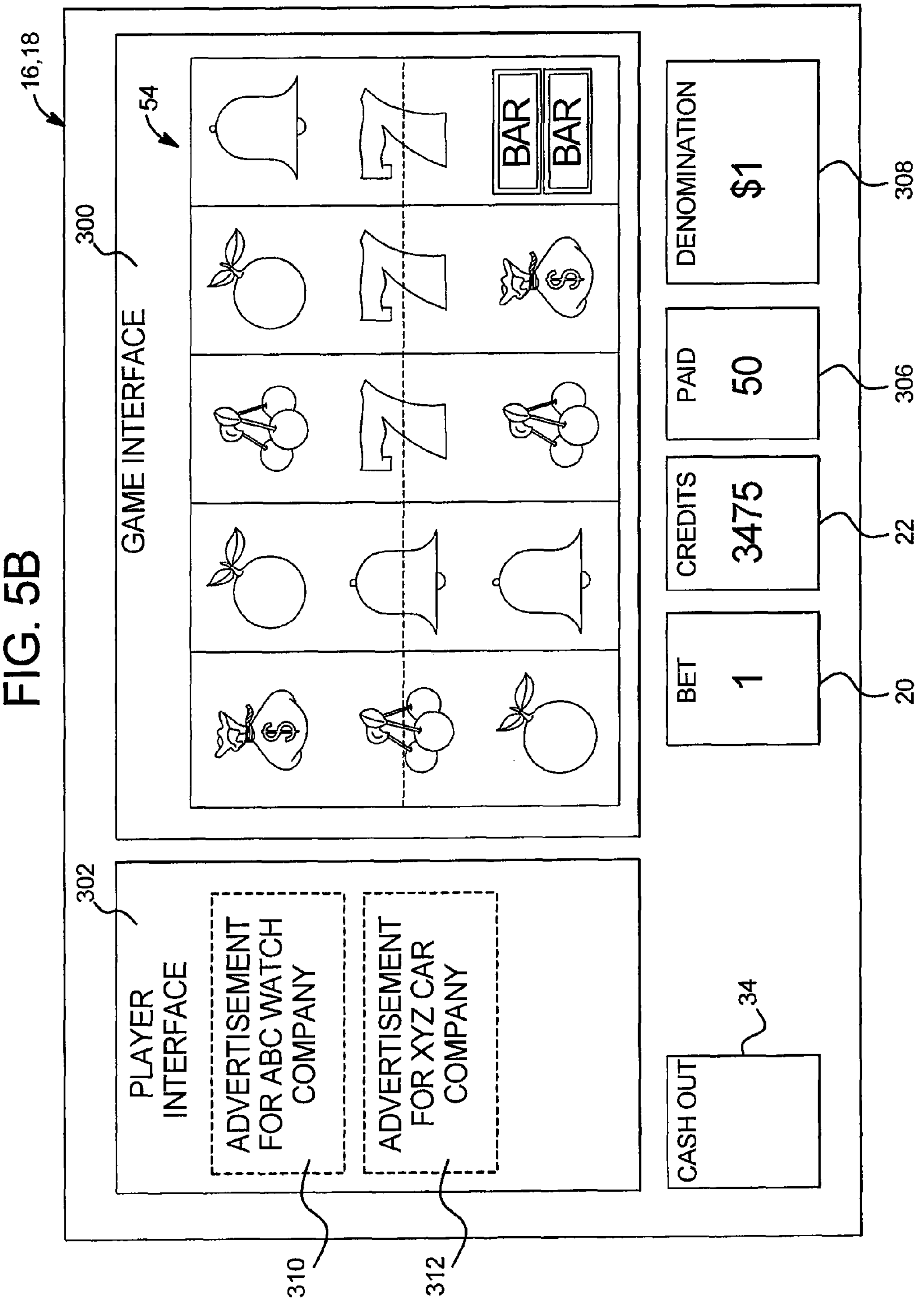
Figure 5C:
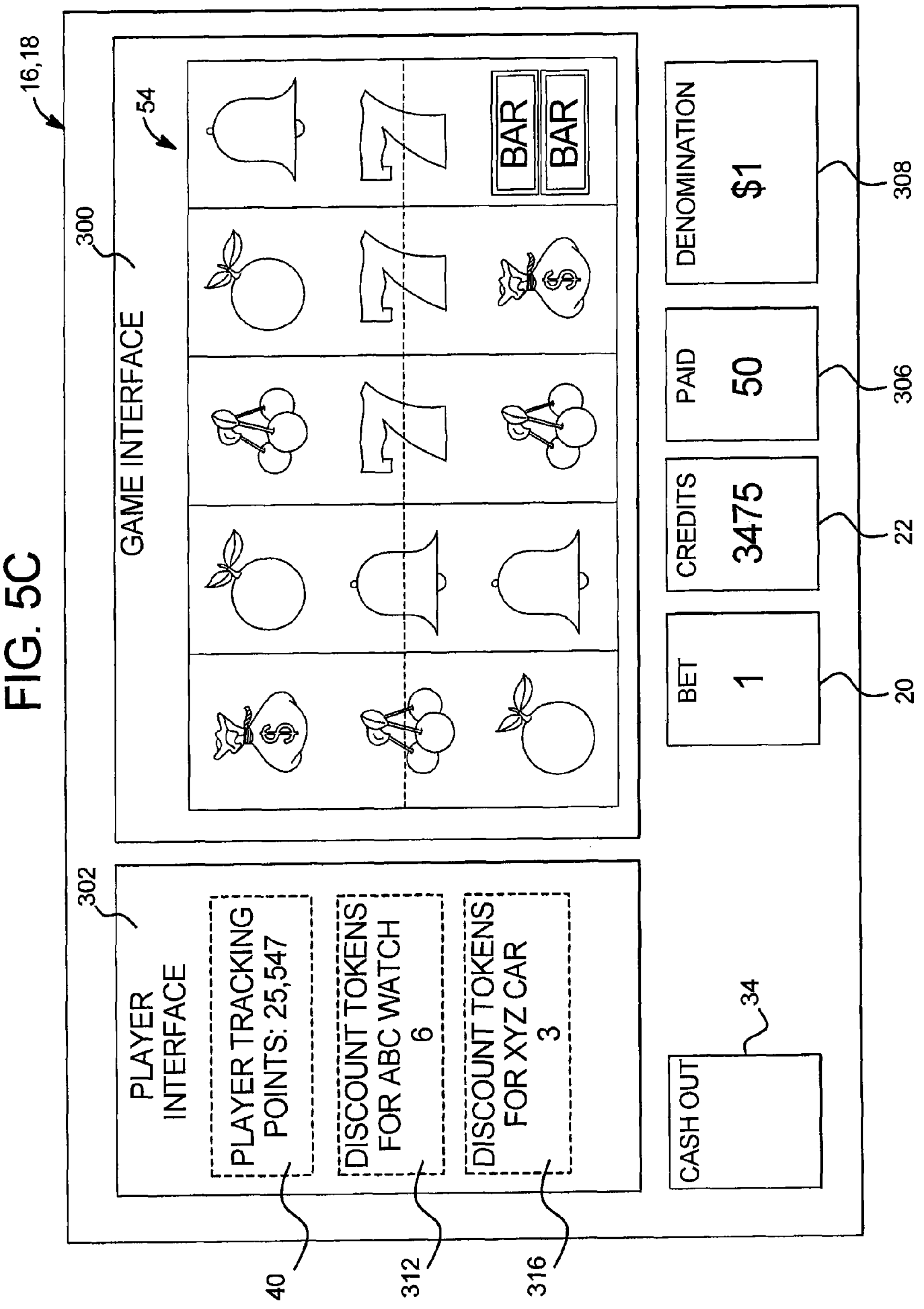

In one embodiment, such as illustrated in FIGS. 5A, 5B, and 5C, a display device 16 or 18 includes a dedicated space or game interface 300 where a primary and/or bonus game are displayed. The game interface 300 includes a plurality of the video reels 54 and is associated with the bet display 20, the credit display 22, the cash out button 34, an award display 306, and a denomination display 308. The display device 16 or 18 of the gaming device also includes a dedicated space or player interface 302 where advertisements and/or information relating to the promotional currency are displayed.

In one embodiment, the player interface 302 operates as an externally controlled interface on the gaming machine. In one such embodiment, the gaming machine is operable to establish a communication link with a host device that enables content provided by the host device to be output on the gaming machine. To output the content provided by the remote host, a host-controlled process that is authenticated by the gaming machine and executed in a secure memory location such that it is isolated from other processes executing on the gaming machine may be utilized. The host-controlled processes may be decoupled from the process used to execute the game of chance played on the gaming machine such that the content output by the host-controlled process doesn't alter the game of chance displayed in association with the game interface 300.

Referring now to FIGS. 5B and 5C, the player interface 302 is operable to display advertisements 310 or 312, promotional currency balances 314 or 316 and the player tracking display 40 so as not to detract from the player's game experience displayed by the game interface 300. That is, the advertisements 310 and 312, the promotional currency balances 314 and 316 and the player tracking display 40 are displayed in the dedicated space 302 independent of the gaming area or interface 300. This benefits both the player and the casino by drawing the player's attention more effectively than messaging in the gaming area (although such messaging could be used). Also since the player interface 302 operates as an externally controlled interface, regulatory concerns associated with altering the game are avoided.

As seen in FIGS. 5B and 5C, the advertisement 310 and the promotional currency balance 314 is associated with a first advertiser and the advertisement 312 and the promotional currency balance 316 is associated with a second advertiser. For example, advertisement 310 is associated with the ABC watch company and promotional currency balance 314 shows that the player has accumulated six discount tokens redeemable for a watch or other good or service from the ABC watch company. Advertisement 312 is associated with the XYZ car company and promotional currency balance 316 shows that the player has accumulated three discount tokens redeemable for a car or other good or service from the XYZ car company. In one embodiment, the game interface 300 and the player interface 302 are operable to display a winning event on the video reels 54 at or substantially at a same time as the advertisement 310 or 312 is displayed.

It should be appreciated that any suitable manner of displaying and providing advertisements or promotional currency may be implemented in accordance with the gaming system disclosed herein. For example, in one embodiment, the gaming system causes the advertisements to be displayed on the gaming machine or at an external signage location that is synchronized and directed to the player.

In one embodiment, the promotional currency expires after a certain amount of time. Providing promotional currency which expires enables the advertiser or sponsor 206 to better control how much promotional currency can be accumulated by the players. For example, the advertiser or sponsor 206 can control discounted amounts provided by the promotion by limiting the amount of promotional currency accumulated by the players.

In one embodiment, the currency has a rolling expiration if not used. For example, the currency expires 30 days after being earned by a player. In this example, a player accumulates 100 discount tokens on Day 1, 200 discount tokens on Day 10 and 300 discount tokens on Day 25. The player has accumulated 600 discount tokens from Days 1 to 25. In this example, the 100 discount tokens accumulated on Day 1 expire on Day 31. That is, the 600 discount tokens accumulated by the player will decrease to 500 discount tokens for Day 31 to Day 40. On Day 41, the 200 discount tokens accumulated on Day 10 will expire. That is, the 500 accumulated by the player will decrease to 300 discount tokens for Day 41 to Day 55. All of the accumulated discount tokens will expire after Day 55 in this example.

In another embodiment, the advertiser or sponsor 206 limits or caps the amount of promotional currency that a player can accumulate at any one time. For example, the advertiser or sponsor caps the amount of promotional currency that a player can accumulate at 500 discount tokens or promotional dollars. When a player accumulates 500 discount tokens, the gaming system informs the player that the player is ineligible to accumulate additional promotional currency, such as discount tokens or promotional dollars. In this example, the player must redeem one or more of the accumulated discount tokens before regaining eligibility to accumulate additional promotional currency. It should be appreciated that any model of expiration may be implemented by either the casino or the advertiser or sponsor for the promotional currency disclosed herein. For example, in one embodiment, the promotional currency has no expiration.

In different embodiments, the gaming system enables the advertiser, the sponsor or the casino to limit the amount of promotional currency that a player can earn or accumulate. In such embodiments, the gaming system inhibits players from accumulating enough promotional currency to purchase a good or service offered by the advertiser or sponsor. In other such embodiments, the gaming system inhibits players from accumulating enough promotional currency to purchase a good or service offered by the advertiser or sponsor below a wholesale cost.

In one embodiment, the gaming system enables players to accumulate the promotional currency over a set period of time. In one such embodiment, the gaming system enables players to accumulate enough promotional currency to purchase a good or service offered by the advertiser or sponsor at a discounted price. In one embodiment, the discounted price is below the wholesale cost of the good or service.

In one embodiment, the gaming system enables players to accumulate or earn the promotional currency in much the same manner as traditional player tracking points. In one embodiment, both promotional currency and player tracking points can be earned simultaneously (either for the same event or for different events). In this embodiment, the player tracking points and the promotional currency operate independently and the player tracking points are not altered, changed, or reduced by the addition of the promotional currency.

In one embodiment, the gaming system enables players to earn or accumulate the promotional currency based on a specified threshold. For example, a player may earn one discount token for every $500 played on a gaming machine. In another example, players of different player profiles or statuses earn the promotional currency at different rates. In this example, a gold player earns one discount token for every $500 played at one of the gaming devices, and a platinum player earns one discount token for every $300 played. In this embodiment, players who play at higher levels and thus spend more money at the gaming machine and casino earn the promotional currency at a faster rate than players who play at lower levels. It should be appreciated that the threshold or manner in which the promotional currency is earned can be defined in any appropriate manner by either the casino, the advertiser, or the sponsor.

In one embodiment, the gaming system enables the casino to automatically match a player with an advertiser or sponsor based on a criteria associated with information known about the player, such as from their player tracking account. For example, all gold players are matched with a first advertiser or sponsor and all platinum players are matched with a second advertiser or sponsor. In another example, all players who like sports are matched with a sports-related advertiser or sponsor and all players who like movies are associated with a movies-related advertiser or sponsor.

In one embodiment, the gaming system limits the player to one advertiser or sponsor so that the player can only earn promotional currency from that advertiser or sponsor at any one time. In another embodiment, the gaming system enables the player to select one or more advertisers or sponsors from a list. That is, the player is able to select which advertiser or sponsor the player wants to earn promotional currency.

In one embodiment, the gaming system enables a player to earn promotional currency from multiple advertisers or sponsors at the same time. In one example, when the player is earning promotional currency from multiple advertisers or sponsors at the same time, the accumulation or earning rate is reduced for the promotional currency associated with each advertiser or sponsor. In this example, a normal accumulation rate for promotional currency associated with ABC watch company is one discount token for every fifty dollars played at one of the gaming devices. Similarly, a normal accumulation rate for promotional currency associated with XYZ car company is one discount token for every seventy-five player tracking points accumulated at one of the gaming devices. In this example, if a player earns promotional currency from multiple advertisers or sponsors at the same time, the normal accumulation or earning rate for each advertiser or sponsor is reduced. Thus, in this example, the accumulation rate for promotional currency associated with ABC watch company is reduced to one discount token for every one-hundred dollars played at one of the gaming devices and the accumulation rate for promotional currency associated with XYZ car company is reduced to one discount token for every one-hundred fifty player tracking points accumulated at one of the gaming devices.

In one embodiment, the gaming system enables a player to earn promotional currency from multiple advertisers or sponsors at the same time. In this embodiment, the same promotional currency is associated with each advertiser or sponsor. For example, a player earns one discount token for every fifty dollars played at one of the gaming devices. The player accumulates one or more discount tokens which can be redeemed for different goods or services (or discounts on such goods and services). In one embodiment, such different goods or services are provided or otherwise associated with different advertisers or sponsors. In this example, the player accumulates ten discount tokens by playing $500 at one or more games at the gaming devices in the gaming system. A first good or service (e.g., a watch from the ABC watch company) is associated with ten discount tokens and a second good or service (e.g., a motorized scooter from the XYZ car company) is associated with fifty discount tokens. The gaming system enables the player to choose whether to redeem the ten discount tokens for a discount on the watch from ABC watch company or to continue playing the one or more games for additional promotion currency. If the player chooses to play for additional promotional currency, the player continues to accrue promotional currency at the rate of one discount token for every fifty dollars played at one of the gaming devices. In one embodiment, if the player chooses to continue playing the one or more games for additional promotion currency, the player accrues the promotional currency at a different rate (e.g., a higher rate or a lower rate).

It should be appreciated that the goods or services available to the player and the amount of promotional currency associated with a discount for each good or service is set by the gaming system operator or the casino. In another embodiment, the gaming system and/or the gaming machines enable the players to select one or more of the goods or services for which to accumulate promotional currency. In this embodiment, the gaming system and/or the gaming machines display one or more goods or services associated with designated quantities of discount tokens and enable the player to select one or more of the goods or services for which to redeem any accumulated promotional currency. It should be appreciated that the player selection can occur before, during or after any promotional currency is accrued or accumulated.

In one embodiment, different goods or services and/or different designated quantities of promotional currency associated with such goods or services are displayed to different players. In different embodiments, such display is based on a characteristic of each player, such as the game or gaming machine being played by the players, the players' player tracking ranking, any promotion status associated with the players' player tracking cards, the players' recent gaming sessions, or any other suitable data. In one example, the gaming system and/or the gaming devices display a watch from ABC watch company and a necklace from XYZ jewelry company to a first player (e.g., a player having a gold status) and a second player (e.g., a player having a platinum status). Discounts for the watch and necklace are each associated with ten discount tokens for the first player and are each associated with seven discount tokens for the second player. Thus, in this example, the amount of promotional currency required to receive the discount is different for the first and second players based on the players' status. In another example, the gaming system and/or the gaming devices display a watch from ABC watch company and a necklace from XYZ jewelry company to a first player (e.g., a player having a gold status). The gaming system and/or the gaming devices display a vacation package from ABC travel company and a $10,000 prepaid credit card from XYZ bank to second player (e.g., a player having a platinum status). Thus, in this example, different goods or services are displayed to the first and second players based on the players' status.

In various embodiments, the gaming system enables players to redeem the promotional currency, such as discount tokens, for a discounted price on a good or service associated with an advertiser or sponsor. In one embodiment, once a player cashes out, a payment device, such as the ticket, payment or note generator 36 prints or otherwise generates a ticket or credit slip to provide to the player. The player receives the ticket or credit slip and may redeem the value associated with the ticket or credit slip via a point-of-sale associated with the advertiser or sponsor.

In another embodiment, when the player cashes out, the player receives discount coins or tokens of the promotional currency in a coin payout tray. It should be appreciated that any suitable payout mechanisms, such as funding to the player's electronically recordable identification card may be implemented in accordance with the gaming device disclosed herein. In one such embodiment, the point-of-sale or retail location of the advertiser or sponsor includes a kiosk or terminal configured to read the player's electronically recordable identification card. The kiosk or terminal enables the player to redeem the electronic payout of the promotional currency. In one embodiment, the promotional currency is electronically applied to a purchase (or discount) on a retailer's website.

In one embodiment, the gaming system provides a verification method for the advertiser, sponsor or retailer to ensure that the voucher or discount tokens are valid. In one embodiment, the casino and the advertiser, sponsor or retailer are linked through a data network. In this embodiment, the player's voucher or discount tokens are verifiable by the advertiser, sponsor or retailer through communication with the issuing casino or other verifying entity. For example, as illustrated in FIG. 4, the advertiser or sponsor 206 requests verification 228 of a player's redemption request from the casino 204. In one embodiment, the casino 204 requests and receives verification 230 and 232 from the gaming system 202. Once the player's redemption request is verified by the gaming system 202 and the casino 204, the casino 204 sends verification 234 to the advertiser, sponsor or retailer. If the player's redemption request is verified, the advertiser, sponsor or retailer provides the good or service to the player (or provides the good or service to the player for a discounted price).

In one embodiment, the point-of-sale or retail location of the advertiser, sponsor or retailer includes a scanner or kiosk configured to scan the voucher to determine who the voucher was issued to, when the voucher was issued and a value of the voucher. In one embodiment, once the voucher, discount token or promotional currency information is verified, the advertiser, sponsor or retailer confirms the name and/or address of the patron through the patron's personal identification card or driver's license. If the patron is entitled to the voucher or the discount provided by the promotional currency, the advertiser, sponsor or retailer provides the good or service to the patron (or provides the good or service to the patron for a discounted price).

In another embodiment, the casino and the advertiser, sponsor or retailer are linked through a data network, such as a verification website operated by the casino, the advertiser or sponsor, or a suitable administrator separate from the casino and advertiser. The website can be secured by any suitable encryption and authentication methods, such as a Secure Sockets Layer (SSL) protocol or another suitable protocol, to protect the confidentiality of web transactions. In one embodiment, the casino and/or gaming system communicates any tracked information, data or activity associated with the players, the games played, and/or the promotional currency to the website administrator. The website administrator compiles the tracked information, data or activity data and incorporates such data into the verification website. The verification website enables the advertiser, sponsor or retailer to verify who the voucher was issued to, when the voucher was issued and a value of the voucher based on the tracked information, data or activity communicated by the casino and/or the gaming system. For example, each advertiser or sponsor can have separate log in information (e.g., username and password) used to access the tracked information, data or activity via the verification website. In one embodiment, once the advertiser, sponsor or retailer verifies the voucher, discount token or promotional currency information, the advertiser, sponsor or retailer confirms the name and/or address of the patron through the patron's personal identification card or driver's license. If the patron is entitled to the voucher or the discount provided by the promotional currency, the advertiser, sponsor or retailer provides the good or service to the patron (or provides the good or service to the patron for a discounted price).

In one embodiment, at least one of the players can access a website, such as the verification website or a transactional website, to view, monitor and/or use any promotional currency accumulated through various game activities. For example, a player can log into the website (e.g., via an username and password) to view, monitor and/or use any promotional currency accumulated in that player's account. In this example, the website can enable the player to spend any accumulated promotional currency at select advertisers or sponsors. In one embodiment, the website displays a list of one or more advertisers or sponsors and one or more payment types for selection by the player.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, the gaming system including a controller configured to communicate with at least one gaming machine, the at least one gaming machine including at least one display device configured to display a game upon placement of a wager having a monetary value, the method comprising:

(a) causing the at least one gaming machine to:
  (i) enable a player to make monetary wagers from a monetary balance on plays of the game;
  (ii) display said wagered-on plays of the game;
  (iii) display any monetary awards for said wagered-on plays of the game and add any monetary awards to the monetary balance;
  (iv) track said wagers made by the player;
  (v) cause data representing said tracked wagers to be communicated to the controller; and
  (vi) upon receiving a cash-out request, provide the monetary balance to the player;
(b) causing the player to be provided with player tracking points based on the data representing said tracked wagers, the player tracking points being in addition to any monetary awards;
(c) additionally tracking at least one activity in association with the at least one gaming machine;
(d) determining if the tracked activity reaches a designated level; and
(e) if the tracked activity reaches the designated level, causing the at least one gaming machine to display an indication to the player that the player has obtained a designated amount of a promotional currency in addition to any player tracking points and any monetary awards, said designated amount of promotional currency being associated with a point-of-sale and having a redeemable value for part of a purchase of a good or service at the point-of-sale, the redeemable value being less than a purchase cost of said good or service.

2. The method of claim 1, wherein the promotional currency is associated with the point-of-sale in response to a fee being paid by the point-of-sale.

3. The method of claim 1, which includes displaying an indication to the player of the designated amount of the promotional currency.

4. The method of claim 1, wherein the at least one activity includes at least one of: (i) a designated wagered monetary value, (ii) a designated total of the wagers, (iii) a designated period of time, (iv) an outcome of at least one play of the game, (v) a determination by the at least one gaming machine, and (vi) a determination by the controller.

5. The method of claim 1, which includes: (i) if the tracked activity reaches a first designated level, causing the at least one gaming machine to display an indication to the player that the player has obtained a first designated amount of the promotional currency, and (ii) if the tracked activity reaches a second different designated level, causing the at least one gaming machine to display an indication to the player that the player has obtained a second different designated amount of the promotional currency.

6. The method of claim 1, which includes setting the designated level based on a determination by the point-of-sale.

7. The method of claim 1, which includes setting the designated level based on at least one characteristic of the player.

8. The method of claim 7, which includes differentiating a plurality of levels based on the at least one characteristic of a plurality of different players.

9. The method of claim 7, which includes differentiating a plurality of levels based on a plurality of characteristics of the player.

10. The method of claim 1, which includes accumulating any designated amounts of the promotional currency provided to the player.

11. The method of claim 1, which includes causing a ticket representing the designated amount of the promotional currency to be provided to the player, wherein the ticket is associated with the player and has a redeemable value associated with the designated amount.

12. The method of claim 1, which includes displaying an advertisement for the good or service associated with the point-of-sale.

13. The method of claim 12, which includes displaying an indication of the designated amount of the promotional currency in association with the advertisement.

14. The method of claim 1, which includes displaying the game separately from an advertisement for the good or service associated with the point-of-sale.

15. The method of claim 1, which is provided through a data network or internet.

16. A method for operating a gaming system provided by a gaming establishment, the method comprising:

(a) causing at least one gaming machine to display a play of a game, the game operable upon placement of a wager of a monetary amount from a monetary balance;

(b) adding any monetary awards for said wagered-on play of the game to said monetary balance;

(c) upon receiving a cash-out request, providing the monetary balance to a player;

(d) monitoring a plurality of events which occur in association with the at least one gaming machine;

(e) if a first one of the monitored events occurs, providing a designated amount of a first player tracking currency for a player, the first player tracking currency being funded by the gaming establishment and being in addition to any monetary awards, the designated amount of the first player tracking currency having a redeemable value for obtaining a good or service at the gaming establishment; and (f) if a second one of the monitored events occurs, providing a designated amount of a second player tracking currency for the player in addition to any provided first player tracking currency and any monetary awards, the second player tracking currency being funded by an entity different from the gaming establishment, the designated amount of the second player tracking currency having a redeemable value for part of, but less than all of, a purchase cost of a designated good or service at the entity.

17. The method of claim 16, wherein the entity includes an advertiser or sponsor associated with a location having at least one purchasable good or service.

18. The method of claim 16, which includes linking the entity with the gaming establishment, the link enabling verification of the redeemable value of the designated amount of the second player tracking currency.

19. The method of claim 16, wherein the plurality of events which can occur in association with the at least one gaming machine are based on at least one of: (i) a designated wagered monetary amount, (ii) a designated total of the wagers, (iii) a designated period of time, (iv) an outcome of the game, (v) a determination by the at least one gaming machine, and (vi) a determination by a controller configured to communicate with the at least one gaming machine.

20. A gaming system comprising:

at least one gaming machine, the at least one gaming machine including at least one display device and at least one input device configured to:

(i) enable a player to make monetary wagers from a monetary balance on plays of a game;

(ii) display said wagered-on plays of the game;

(iii) display any monetary awards for said wagered-on plays of the game and add any monetary awards to the monetary balance;

(iv) track said wagers made by the player;

(v) cause data representing said tracked wagers to be communicated to a player tracking system; and (vi) upon receiving a cash-out request, provide the monetary balance to the player;

a player tracking system configured to provide player tracking points for the player in addition to any monetary awards based on said data representing said tracked wagers; and a controller configured to operate with the at least one gaming machine and the player tracking system to:

(i) determine if at least one designated event occurs in association with the at least one gaming machine; and (ii) if the at least one designated event occurs, cause the at least one gaming machine to display an indication that the player has obtained a promotional currency, the promotional currency being in addition to and separate from any player tracking points and any monetary awards, the promotional currency having a redeemable value for part of a purchase of a good or service associated with a point-of-sale, the redeemable value being less than a purchase cost of the good or service at the point-of-sale.

21. The gaming system of claim 20, wherein the at least one gaming machine is associated with a gaming establishment and the point-of-sale is separate from the gaming establishment.

22. The gaming system of claim 20, wherein the designated event is determined by at least one of: (i) the point-of-sale, (ii) the gaming establishment, and (iii) the controller.

23. The gaming system of claim 20, wherein the at least one event which can occur in association with the at least one gaming machine is based on at least one of: (1) a designated wagered monetary value, (ii) a designated total of the wagers, (iii) a designated period of time, (iv) an outcome of the game, (v) a determination by the at least one gaming machine, and (vi) a determination by the controller.

24. The gaming system of claim 20, wherein the promotional currency is funded by the point-of-sale.

25. The gaming system of claim 20, wherein the promotional currency is at least partially funded with a fee paid by the point-of-sale.

26. A gaming system comprising:

at least one gaming machine, the at least one gaming machine including at least one display device and at least one input device configured to:

(a) display a play of a game upon placement of a monetary wager from a monetary balance;

(b) add any monetary awards for said wagered-on play of the game to the monetary balance;

(c) upon receiving a cash-out request, provide the monetary balance to a player; and a controller operable with the at least one gaming machine to:

(a) enable the at least one gaming machine to cause a number of player tracking points to be provided for the player based on monetary wagers made by the player on any plays of the game, the player tracking points being in addition to any monetary awards and having a redeemable value for obtaining a good or service associated with a gaming establishment;

(b) enable the at least one gaming machine to provide a promotional currency to a player, the promotional currency being in addition to any monetary awards and any player tracking points and having a redeemable value for part of a purchase of a good or service associated with a point-of-sale, the redeemable value being less than a purchase cost of the good or service at the point-of-sale;

(c) determine if any one of a plurality of different designated events occur in association with the at least one gaming machine;

(d) if a first designated event occurs, cause the at least one gaming machine to display an indication of a first designated amount of the promotional currency for the player in addition to any player tracking points and any monetary awards provided for the player; and (e) if a second different designated event occurs, cause the at least one gaming machine to display an indication of a second different designated amount of the promotional currency for the player in addition to any player tracking points and any monetary awards provided for the player.

* * * * *

UNITED STATES PATENT AND TRADEMARK OFFICE

CERTIFICATE OF CORRECTION

PATENT NO. : 8,357,034 B2
APPLICATION NO. : 11/937382
DATED : January 22, 2013
INVENTOR(S) : Vincent P. Smith et al.

It is certified that error appears in the above-identified patent and that said Letters Patent is hereby corrected as shown below:

IN THE CLAIMS

In Claim 1, Column 34, Line 10, between "said" and "wagers" insert --monetary--.
In Claim 1, Column 34, Line 11, between "tracked" and "wagers" insert --monetary--.
In Claim 1, Column 34, Lines 17 to 18, between "tracked" and "wagers" insert --monetary--.
In Claim 1, Column 34, Lines 22 and 24, between "tracked" and "activity" insert --at least one--.
In Claim 4, Column 34, Line 42, between "the" and "wagers" insert --monetary--.
In Claim 5, Column 34, Lines 46 to 47, between "tracked" and "activity" insert --at least one--.
In Claim 5, Column 34, Line 50, between "tracked" and "activity" insert --at least one--.
In Claim 20, Column 36, Line 4, between "said" and "wagers" insert --monetary--.
In Claim 20, Column 36, Line 5, between "tracked" and "wagers" insert --monetary--.
In Claim 20, Column 36, Lines 11 to 12, between "tracked" and "wagers" insert --monetary--.
In Claim 22, Column 36, Line 31, between "the" and "designated" insert --at least one--.
In Claim 22, Column 36, Line 33, replace the first instance of "the" with --a--.
In Claim 23, Column 36, Lines 34 to 35, between "one" and "event" insert --designated--.
In Claim 23, Column 36, Line 36, replace "1" with --i--.
In Claim 23, Column 36, Line 37, between "the" and "wagers" insert --monetary--.
In Claim 26, Column 36, Line 66, replace "a" with --the--.

Signed and Sealed this
Eleventh Day of June, 2013

Teresa Stanek Rea
*Acting Director of the United States Patent and Trademark Office*